United States Patent
Hua et al.

(10) Patent No.: US 12,446,012 B2
(45) Date of Patent: Oct. 14, 2025

(54) DOWNLINK TRANSMISSION METHOD AND APPARATUS

(71) Applicant: HUAWEI TECHNOLOGIES CO., LTD., Shenzhen (CN)

(72) Inventors: Meng Hua, Shanghai (CN); Jinlin Peng, Shanghai (CN); Yi Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 325 days.

(21) Appl. No.: 18/335,716

(22) Filed: Jun. 15, 2023

(65) Prior Publication Data

US 2023/0328701 A1 Oct. 12, 2023

Related U.S. Application Data

(63) Continuation of application No. PCT/CN2020/137712, filed on Dec. 18, 2020.

(51) Int. Cl.
*H04W 72/0446* (2023.01)
*H04L 1/00* (2006.01)
(Continued)

(52) U.S. Cl.
CPC ....... *H04W 72/0446* (2013.01); *H04L 1/0061* (2013.01); *H04L 1/08* (2013.01); *H04W 72/232* (2023.01)

(58) Field of Classification Search
None
See application file for complete search history.

(56) References Cited

U.S. PATENT DOCUMENTS

2019/0182012 A1\* 6/2019 Liu .................. H04W 72/04
2020/0008205 A1\* 1/2020 Wang ............... H04W 72/23
(Continued)

FOREIGN PATENT DOCUMENTS

WO WO-2008127038 A1 \* 10/2008 ............ H04W 72/23

OTHER PUBLICATIONS

MediaTek Inc., On Multi-cell PDSCH scheduling via a single DCI, 3GPP TSG RAN WG1 Meeting #102-e R1-2005628, e-Meeting, Aug. 17-Aug. 28, 2020, total 3 pages.
(Continued)

*Primary Examiner* — Kashif Siddiqui
(74) *Attorney, Agent, or Firm* — HAUPTMAN HAM, LLP

(57) ABSTRACT

A downlink transmission method includes determining a time domain position of at least one first transmission resource in resources of a downlink data channel. When the at least one first transmission resource is a plurality of first transmission resources, start positions of time domain positions of the plurality of first transmission resources are the same. The at least one first transmission resource can be used to transmit downlink control information. The method also includes determining, based on the time domain position of the at least one first transmission resource and time domain positions of the resources of the downlink data channel, a condition satisfied by the at least one first transmission resource. The method further includes determining a transmission mode of the downlink control information and/or the downlink data channel in the resources of the downlink data channel based on the condition.

20 Claims, 8 Drawing Sheets

(51) Int. Cl.
*H04L 1/08* (2006.01)
*H04W 72/232* (2023.01)

(56) References Cited

U.S. PATENT DOCUMENTS

2020/0281015 A1* 9/2020 Li .................... H04W 72/0446
2022/0329400 A1* 10/2022 Pelletier ............... H04L 5/0053

OTHER PUBLICATIONS

Qualcomm Incorporated, Considerations for PDCCH Monitoring Reduction and Power Saving of RedCap Devices, 3GPP TSG RAN WG1 #101 R1-2004494, e-Meeting, May 25-Jun. 5, 2020, total 7 pages.

* cited by examiner

DOWNLINK TRANSMISSION METHOD AND APPARATUS

CROSS-REFERENCE TO RELATED APPLICATIONS

This application is a continuation of International Application No. PCT/CN2020/137712, filed on Dec. 18, 2020, the disclosure of which is hereby incorporated by reference in its entirety.

TECHNICAL FIELD

This application relates to the field of communication technologies, and in particular, to a downlink transmission method and apparatus.

BACKGROUND

Currently, to send downlink control information (DCI) to user equipment (UE), a base station needs to send the downlink control information through a physical downlink control channel (PDCCH). In a current protocol, a resource is preset, and the UE may monitor the PDCCH in the preset resource. To ensure scheduling flexibility of a plurality of users, the UE may need to monitor the PDCCH in a large quantity of preset resources. This increases power consumption of the UE and also increases a receiving delay of the DCI.

SUMMARY

Embodiments of this application provide a downlink transmission method and apparatus, to reduce power consumption for receiving downlink control information by UE.

According to a first aspect, a first downlink transmission method is provided. The method may be performed by a terminal device, may be performed by a chip system that can implement a function of the terminal device, or may be performed by a large device including a terminal device. The method includes: determining a time domain position of at least one first transmission resource in resources of a downlink data channel, where when the at least one first transmission resource is a plurality of first transmission resources, start positions of time domain positions of the plurality of first transmission resources are the same; and the at least one first transmission resource can be used to transmit downlink control information; determining, based on the time domain position of the at least one first transmission resource and time domain positions of the resources of the downlink data channel, a condition satisfied by the at least one first transmission resource, where the condition satisfied by the at least one first transmission resource includes a first condition or a second condition, the first condition is that a start position of the time domain position of the at least one first transmission resource is earlier than a first time domain position, and the second condition is that the start position of the time domain position of the at least one first transmission resource is the same as or later than the first time domain position, where the first time domain position is a position offset by a first time interval from a start position of the time domain positions of the resources of the downlink data channel, and the first time domain position is the same as or later than the start position of the time domain positions of the resources of the downlink data channel; and determining a transmission mode of the downlink control information and/or the downlink data channel in the resources of the downlink data channel based on the condition satisfied by the at least one first transmission resource.

According to embodiments of this application, the downlink control information can be transmitted through the resources of the downlink data channel. In other words, resources that can transmit the downlink control information are extended. In this way, the terminal device only needs to monitor (or detect, or listen to) the downlink control information in the resources that are of the downlink data channel and that are configured for the terminal device. While downlink control information sending performance of the terminal device is ensured as much as possible, a quantity of times that the terminal device monitors the downlink control channel in preset resources can be reduced, power consumption of the terminal device can be reduced, and a receiving delay of the downlink control information can also be reduced. In addition, in embodiments of this application, the condition satisfied by the at least one first transmission resource can be determined based on the time domain position of the at least one first transmission resource that is in the resources of the downlink data channel and that can transmit the downlink control information. Therefore, the transmission mode of the downlink control information and/or the downlink data channel in the resources of the downlink data channel can be determined. In other words, an implementation of transmitting the downlink control information in the resources of the downlink data channel is provided.

In an optional implementation, the method further includes: receiving first downlink control information from a network device. When the at least one first transmission resource satisfies the first condition, the first downlink control information indicates that the at least one first transmission resource transmits the downlink control information, or indicates that the at least one first transmission resource does not transmit the downlink control information; or when the at least one first transmission resource satisfies the second condition, the first downlink control information indicates that the at least one first transmission resource transmits the downlink control information, or indicates that the downlink control information is monitored on the at least one first transmission resource; or when the at least one first transmission resource satisfies the second condition, the first downlink control information does not indicate that the at least one first transmission resource transmits the downlink control information, does not indicate that the at least one first transmission resource does not transmit the downlink control information, and does not indicate that the downlink control information is monitored on the at least one first transmission resource.

Missing detection or false alarm may occur in the downlink control information to affect performance of the downlink data channel. Therefore, to improve performance of the downlink data channel, the terminal device may determine the transmission mode of the downlink control information in the resources of the downlink data channel through the first downlink control information. If the at least one first transmission resource satisfies the first condition, it indicates that a distance between the time domain position of the at least one first transmission resource and a time domain position of the first downlink control information may be short. When the network device sends the first downlink control information, whether the downlink control information is to be sent in the at least one first transmission resource can be determined. Therefore, first indication information can provide a clear indication, to reduce a blind detection process of the terminal device. If the first transmission resource satisfies the second condition, it indicates that the distance between the time domain position of the at least one first transmission resource and the time domain position of the first downlink control information is long. When the network device sends the first downlink control information, whether the downlink control information is sent in the at least one first transmission resource can be determined, or whether the downlink control information is sent in the at least one first transmission resource cannot be determined. Therefore, when whether the downlink control information is sent in the at least one first transmission resource cannot be determined, the first downlink control information may indicate that the downlink control information is monitored on the at least one first transmission resource, instead of indicating that the at least one first transmission resource does not transmit the downlink control information. In this indication manner, different generation times of the downlink control information are considered, and a probability of an error detected by the terminal device is reduced. Alternatively, if the first transmission resource satisfies the second condition, when sending the first downlink control information, the network device may not be able to determine whether the downlink control information is to be sent in the at least one first transmission resource. Therefore, the first downlink control information does not indicate whether the at least one first transmission resource transmits the downlink control information. The terminal device only needs to perform blind detection, to reduce a probability of an indication error.

In an optional implementation, the determining a transmission mode of the downlink control information in the resources of the downlink data channel based on the condition satisfied by the at least one first transmission resource includes:

when the at least one first transmission resource satisfies the first condition, determining that a quantity of CRC bits of the downlink control information transmitted in the at least one first transmission resource is a first quantity of bits; or when the at least one first transmission resource satisfies the first condition and the network device indicates that the at least one first transmission resource transmits the downlink control information, determining that a quantity of CRC bits of the downlink control information transmitted in the at least one first transmission resource is a first quantity of bits; and when the at least one first transmission resource satisfies the first condition and the network device indicates that the downlink control information is monitored on the at least one first transmission resource, determining that the quantity of CRC bits of the downlink control information transmitted in the at least one first transmission resource is a second quantity of bits, where the first quantity of bits is less than the second quantity of bits.

In an optional implementation, the determining a transmission mode of the downlink control information in the resources of the downlink data channel based on the condition satisfied by the at least one first transmission resource includes: when the at least one first transmission resource satisfies the second condition, determining that the quantity of CRC bits of the downlink control information transmitted in the at least one first transmission resource is the second quantity of bits; or when the at least one first transmission resource satisfies the second condition and the network device indicates that the at least one first transmission resource transmits the downlink control information, determining that the quantity of CRC bits of the downlink control information transmitted in the at least one first transmission resource is the first quantity of bits; or when the at least one first transmission resource satisfies the second condition and the network device indicates that the downlink control information is monitored on the at least one first transmission resource, determining that the quantity of CRC bits of the downlink control information transmitted in the at least one first transmission resource is the second quantity of bits, where the first quantity of bits is less than the second quantity of bits.

If it is determined that a group of transmission resources is to transmit the downlink control information, the quantity of CRC bits may be smaller, to reduce transmission overheads. If it is not determined whether a group of transmission resources transmits the downlink control information, the quantity of CRC bits needs to be larger, to reduce a probability of an error in detecting the downlink control information.

In an optional implementation, the determining a transmission mode of the downlink data channel in the resources of the downlink data channel based on the condition satisfied by the at least one first transmission resource includes: when the at least one first transmission resource satisfies the first condition, determining that a mapping manner used by the resources of the downlink data channel for a first transmission resource that is in the at least one first transmission resource and that transmits the downlink control information is a rate matching manner; or when the at least one first transmission resource satisfies the first condition and the network device indicates that the at least one first transmission resource transmits the downlink control information, determining that a mapping manner used by the resources of the downlink data channel for a first transmission resource that is in the at least one first transmission resource and that transmits the downlink control information is a rate matching manner.

If it is determined that a group of transmission resources is to transmit the downlink control information, performance of rate matching is better than that of puncturing. Alternatively, whether the group of transmission resources is to transmit the downlink control information may not necessarily be determined. As long as the at least one first transmission resource satisfies the first condition, the terminal device determines that the mapping manner used by the resources of the downlink data channel for the first transmission resource that is in the at least one first transmission resource and that transmits the downlink control information is the rate matching manner. In other words, the terminal device does not need to determine another condition. The implementation for the terminal device is simple.

In an optional implementation, the determining a transmission mode of the downlink data channel in the resources of the downlink data channel based on the condition satisfied by the at least one first transmission resource includes: when the at least one first transmission resource satisfies the second condition, determining that the mapping manner used by the resources of the downlink data channel for the first transmission resource that is in the at least one first transmission resource and that transmits the downlink control information is a puncturing manner; or when the at least one first transmission resource satisfies the second condition and the network device indicates that the at least one first transmission resource transmits the downlink control information, determining that the mapping manner used by the resources of the downlink data channel for the first transmission resource that is in the at least one first transmission resource and that transmits the downlink control information is the rate matching manner; or when the at least one first transmission resource satisfies the second condition and the network device indicates that the downlink control information is monitored on the at least one first transmission resource, determining that the mapping manner used by the resources of the downlink data channel for the first transmission resource that is in the at least one first transmission resource and that transmits the downlink control information is the puncturing manner.

If it is determined that a group of transmission resources is to transmit the downlink control information, performance of rate matching is better than that of puncturing. Therefore, if it is determined that the at least one first transmission resource transmits the downlink control information, the mapping manner used by the resources of the downlink data channel for the first transmission resource that is in the at least one first transmission resource and that transmits the downlink control information may be the rate matching manner. However, if it is not determined whether the at least one first transmission resource transmits the downlink control information, for example, whether the at least one first transmission resource transmits the downlink control information is determined only through blind detection is performed, the puncturing manner can ensure as much as possible that mapping of resources that are used to transmit the downlink data channel and that are in the resources of the downlink data channel is correct whether a result of the blind detection is correct or not. Therefore, when an error may occur during the blind detection, performance of puncturing is better than that of rate matching. Therefore, if the network device indicates that the downlink control information is monitored on the at least one first transmission resource, the mapping manner used by the resources of the downlink data channel for the first transmission resource that is in the at least one first transmission resource and that transmits the downlink control information is the puncturing manner. Alternatively, whether the group of transmission resources is to transmit the downlink control information may not necessarily be determined. As long as the at least one first transmission resource satisfies the second condition, the terminal device determines that the mapping manner used by the resources of the downlink data channel for the first transmission resource that is in the at least one first transmission resource and that transmits the downlink control information is the puncturing manner. In other words, the terminal device does not need to determine another condition. The implementation for the terminal device is simple.

In an optional implementation, the determining a transmission mode of the downlink data channel in the resources of the downlink data channel based on the condition satisfied by the at least one first transmission resource includes: when the at least one first transmission resource satisfies the first condition and the network device indicates that the at least one first transmission resource transmits the downlink control information, determining that redundancy versions of the first repetition and a second repetition of the downlink data channel in time domain are both first redundancy versions configured by the network device for the downlink data channel; and when the at least one first transmission resource satisfies the second condition and the network device indicates that the at least one first transmission resource transmits the downlink control information, determining that the redundancy version of the first repetition of the downlink data channel in time domain is the first redundancy version configured by the network device for the downlink data channel, and that the redundancy version of the second repetition of the downlink data channel in time domain is a second redundancy version configured by the network device for the downlink data channel.

For example, when the at least one first transmission resource satisfies the first condition, the time domain position of the at least one first transmission resource is earlier, and it is very likely that the at least one first transmission resource is all located in a resource of a first repetition of the downlink data channel in time domain. In this case, the at least one first transmission resource transmits the downlink control information, and the downlink control information occupies specific bits. As a result, complete system bits may not be transmitted in the first repetition. In this case, if the terminal device receives a transport block that does not include the complete system bits, self-decoding may not be performed, and original information cannot be obtained. Therefore, in this embodiment of this application, the redundancy versions of the first repetition and the second repetition of the downlink data channel in time domain may be the first redundancy versions configured by the network device for the downlink data channel. For example, a transport block transmitted by using the redundancy version may include the system bits. In this case, even if the first repetition of the downlink data channel in time domain cannot include the complete system bits due to transmission of the downlink control information, the redundancy version of the second repetition of the downlink data channel in time domain is also the redundancy version. In this case, the second repetition of the downlink data channel in time domain may include the complete system bits. In this case, the terminal device can also perform self-decoding based on the transport block transmitted in the second repetition of the downlink data channel in time domain, to obtain the original information, so that a probability of correct decoding by the terminal device is increased.

In an optional implementation, when the at least one first transmission resource is a plurality of first transmission resources, there are two first transmission resources corresponding to different aggregation levels in the plurality of first transmission resources.

If the at least one transmission resource includes a plurality of first transmission resources, there may be two first transmission resources corresponding to different aggregation levels in the plurality of first transmission resources. For example, different first transmission resources in the plurality of first transmission resources correspond to different aggregation levels. In other words, the aggregation levels are in a one-to-one correspondence with the first transmission resources. Alternatively, in the plurality of first transmission resources, there may be two first transmission resources corresponding to a same aggregation level, and there are also two first transmission resources corresponding to different aggregation levels.

According to a second aspect, a second downlink transmission method is provided. The method may be performed by a terminal device, may be performed by a chip system that can implement a function of the terminal device, or may be performed by a large device including a terminal device. The method includes: determining a time domain position of at least one first transmission resource in resources of a downlink data channel, where when the at least one first transmission resource is a plurality of first transmission resources, start positions of time domain positions of the plurality of first transmission resources are the same; and the at least one first transmission resource can be used to transmit downlink control information; determining, based on the time domain position of the at least one first transmission resource and time domain positions of the resources of the downlink data channel, a condition satisfied by the at least one first transmission resource, where the condition satisfied by the at least one first transmission resource includes a first condition or a second condition, the first condition is that the at least one first transmission resource is all located in a resource of a first repetition of the downlink data channel in time domain, and the second condition is that the at least one first transmission resource is not all located in the resource of the first repetition of the downlink data channel in time domain; and determining a transmission mode of the downlink control information and/or the downlink data channel in the resources of the downlink data channel based on the condition satisfied by the at least one first transmission resource.

According to embodiments of this application, the downlink control information can be transmitted through the resources of the downlink data channel. In other words, resources that can transmit the downlink control information are extended. In this way, the terminal device only needs to monitor (or detect, or listen to) the downlink control information in the resources that are of the downlink data channel and that are configured for the terminal device. While downlink control information sending performance of the terminal device is ensured as much as possible, a quantity of times that the terminal device monitors the downlink control channel in preset resources can be reduced, power consumption of the terminal device can be reduced, and a receiving delay of the downlink control information can also be reduced. In addition, in embodiments of this application, the condition satisfied by the at least one first transmission resource can be determined based on the time domain position of the at least one first transmission resource that is in the resources of the downlink data channel and that can transmit the downlink control information. Therefore, the transmission mode of the downlink control information and/or the downlink data channel in the resources of the downlink data channel can be determined. In other words, an implementation of transmitting the downlink control information in the resources of the downlink data channel is provided.

In an optional implementation, the method further includes: receiving first downlink control information from a network device. When the at least one first transmission resource satisfies the first condition, the first downlink control information indicates that the at least one first transmission resource transmits the downlink control information, or indicates that the at least one first transmission resource does not transmit the downlink control information; or when the at least one first transmission resource satisfies the second condition, the first downlink control information indicates that the at least one first transmission resource transmits the downlink control information, or indicates that the downlink control information is monitored on the at least one first transmission resource; or when the at least one first transmission resource satisfies the second condition, the first downlink control information does not indicate that the at least one first transmission resource transmits the downlink control information, does not indicate that the at least one first transmission resource does not transmit the downlink control information, and does not indicate that the downlink control information is monitored on the at least one first transmission resource.

In an optional implementation, the determining a transmission mode of the downlink control information in the resources of the downlink data channel based on the condition satisfied by the at least one first transmission resource includes:
when the at least one first transmission resource satisfies the first condition, determining that a quantity of CRC bits of the downlink control information transmitted in the at least one first transmission resource is a first quantity of bits; or when the at least one first transmission resource satisfies the first condition and the network device indicates that the at least one first transmission resource transmits the downlink control information, determining that a quantity of CRC bits of the downlink control information transmitted in the at least one first transmission resource is a first quantity of bits; and
when the at least one first transmission resource satisfies the first condition and the network device indicates that the downlink control information is monitored on the at least one first transmission resource, determining that the quantity of CRC bits of the downlink control information transmitted in the at least one first transmission resource is a second quantity of bits, where
the first quantity of bits is less than the second quantity of bits.

In an optional implementation, the determining a transmission mode of the downlink control information in the resources of the downlink data channel based on the condition satisfied by the at least one first transmission resource includes: when the at least one first transmission resource satisfies the second condition, determining that the quantity of CRC bits of the downlink control information transmitted in the at least one first transmission resource is the second quantity of bits; or when the at least one first transmission resource satisfies the second condition and the network device indicates that the at least one first transmission resource transmits the downlink control information, determining that the quantity of CRC bits of the downlink control information transmitted in the at least one first transmission resource is the first quantity of bits; or when the at least one first transmission resource satisfies the second condition and the network device indicates that the downlink control information is monitored on the at least one first transmission resource, determining that the quantity of CRC bits of the downlink control information transmitted in the at least one first transmission resource is the second quantity of bits, where the first quantity of bits is less than the second quantity of bits.

In an optional implementation, the determining a transmission mode of the downlink data channel in the resources of the downlink data channel based on the condition satisfied by the at least one first transmission resource includes: when the at least one first transmission resource satisfies the first condition, determining that a mapping manner used by the resources of the downlink data channel for a first transmission resource that is in the at least one first transmission resource and that transmits the downlink control information is a rate matching manner; or when the at least one first transmission resource satisfies the first condition and the network device indicates that the at least one first transmission resource transmits the downlink control information, determining that a mapping manner used by the resources of the downlink data channel for a first transmission resource that is in the at least one first transmission resource and that transmits the downlink control information is a rate matching manner.

In an optional implementation, the determining a transmission mode of the downlink data channel in the resources of the downlink data channel based on the condition satisfied by the at least one first transmission resource includes: when the at least one first transmission resource satisfies the second condition, determining that the mapping manner used by the resources of the downlink data channel for the first transmission resource that is in the at least one first transmission resource and that transmits the downlink control information is a puncturing manner; or when the at least one first transmission resource satisfies the second condition and the network device indicates that the at least one first transmission resource transmits the downlink control information, determining that the mapping manner used by the resources of the downlink data channel for the first transmission resource that is in the at least one first transmission resource and that transmits the downlink control information is the rate matching manner; or when the at least one first transmission resource satisfies the second condition and the network device indicates that the downlink control information is monitored on the at least one first transmission resource, determining that the mapping manner used by the resources of the downlink data channel for the first transmission resource that is in the at least one first transmission resource and that transmits the downlink control information is the puncturing manner.

In an optional implementation, the determining a transmission mode of the downlink data channel in the resources of the downlink data channel based on the condition satisfied by the at least one first transmission resource includes: when the at least one first transmission resource satisfies the first condition and the network device indicates that the at least one first transmission resource transmits the downlink control information, determining that redundancy versions of the first repetition and a second repetition of the downlink data channel in time domain are both first redundancy versions configured by the network device for the downlink data channel; and when the at least one first transmission resource satisfies the second condition and the network device indicates that the at least one first transmission resource transmits the downlink control information, determining that the redundancy version of the first repetition of the downlink data channel in time domain is the first redundancy version configured by the network device for the downlink data channel, and that the redundancy version of the second repetition of the downlink data channel in time domain is a second redundancy version configured by the network device for the downlink data channel.

In an optional implementation, when the at least one first transmission resource is a plurality of first transmission resources, there are two first transmission resources corresponding to different aggregation levels in the plurality of first transmission resources.

For technical effects brought by the optional implementations of the second aspect, refer to descriptions of the technical effects brought by the first aspect or the corresponding implementations.

According to a third aspect, a third downlink transmission method is provided. The method may be performed by a network device or by a chip system, where the chip system can implement functions of the network device. For example, the network device is an access network device, for example, a base station. The method includes: configuring resources of a downlink data channel for a terminal device, where the resources of the downlink data channel include at least one first transmission resource; when the at least one first transmission resource is a plurality of first transmission resources, start positions of time domain positions of the plurality of first transmission resources are the same; and the at least one first transmission resource can be used to transmit downlink control information; and determining a transmission mode of the downlink control information and/or the downlink data channel in the resources of the downlink data channel based on a condition satisfied by the at least one first transmission resource, where the at least one first transmission resource satisfies a first condition or a second condition, the condition satisfied by the at least one first transmission resource is determined based on a time domain position of the at least one first transmission resource and time domain positions of the resources of the downlink data channel, the first condition is that a start position of the time domain position of the at least one first transmission resource is earlier than a first time domain position, and the second condition is that the start position of the time domain position of the at least one first transmission resource is the same as or later than the first time domain position, where the first time domain position is a position offset by a first time interval from a start position of the time domain positions of the resources of the downlink data channel, and the first time domain position is the same as or later than the start position of the time domain positions of the resources of the downlink data channel.

In an optional implementation, the method further includes: sending first downlink control information to the terminal device. When the at least one first transmission resource satisfies the first condition, the first downlink control information indicates that the at least one first transmission resource transmits the downlink control information, or indicates that the at least one first transmission resource does not transmit the downlink control information; or when the at least one first transmission resource satisfies the second condition, the first downlink control information indicates that the at least one first transmission resource transmits the downlink control information, or indicates that the downlink control information is monitored on the at least one first transmission resource; or when the at least one first transmission resource satisfies the second condition, the first downlink control information does not indicate that the at least one first transmission resource transmits the downlink control information, does not indicate that the at least one first transmission resource does not transmit the downlink control information, and does not indicate that the downlink control information is monitored on the at least one first transmission resource.

In an optional implementation, the determining a transmission mode of the downlink control information in the resources of the downlink data channel based on the condition satisfied by the at least one first transmission resource includes:
  when the at least one first transmission resource satisfies the first condition, determining that a quantity of CRC bits of the downlink control information transmitted in the at least one first transmission resource is a first quantity of bits; or when the at least one first transmission resource satisfies the first condition and the at least one first transmission resource transmits the downlink control information, determining that a quantity of CRC bits of the downlink control information transmitted in the at least one first transmission resource is a first quantity of bits; and
  when the at least one first transmission resource satisfies the first condition and the terminal device needs to monitor the downlink control information on the at least one first transmission resource, determining that the quantity of CRC bits of the downlink control information transmitted in the at least one first transmission resource is a second quantity of bits, where the first quantity of bits is less than the second quantity of bits.

In an optional implementation, the determining a transmission mode of the downlink control information in the resources of the downlink data channel based on the condition satisfied by the at least one first transmission resource includes: when the at least one first transmission resource satisfies the second condition, determining that the quantity of CRC bits of the downlink control information transmitted in the at least one first transmission resource is the second quantity of bits; or when the at least one first transmission resource satisfies the second condition and the at least one first transmission resource transmits the downlink control information, determining that the quantity of CRC bits of the downlink control information transmitted in the at least one first transmission resource is the first quantity of bits; or when the at least one first transmission resource satisfies the second condition and the terminal device needs to monitor the downlink control information on the at least one first transmission resource, determining that the quantity of CRC bits of the downlink control information transmitted in the at least one first transmission resource is the second quantity of bits, where the first quantity of bits is less than the second quantity of bits.

In an optional implementation, the determining a transmission mode of the downlink data channel in the resources of the downlink data channel based on the condition satisfied by the at least one first transmission resource includes: when the at least one first transmission resource satisfies the first condition, determining that a mapping manner used by the resources of the downlink data channel for a first transmission resource that is in the at least one first transmission resource and that transmits the downlink control information is a rate matching manner; or when the at least one first transmission resource satisfies the first condition and the at least one first transmission resource transmits the downlink control information, determining that a mapping manner used by the resources of the downlink data channel for a first transmission resource that is in the at least one first transmission resource and that transmits the downlink control information is a rate matching manner.

In an optional implementation, the determining a transmission mode of the downlink data channel in the resources of the downlink data channel based on the condition satisfied by the at least one first transmission resource includes: when the at least one first transmission resource satisfies the second condition, determining that the mapping manner used by the resources of the downlink data channel for the first transmission resource that is in the at least one first transmission resource and that transmits the downlink control information is a puncturing manner; or when the at least one first transmission resource satisfies the second condition and the at least one first transmission resource transmits the downlink control information, determining that the mapping manner used by the resources of the downlink data channel for the first transmission resource that is in the at least one first transmission resource and that transmits the downlink control information is the rate matching manner; or when the at least one first transmission resource satisfies the second condition and the terminal device needs to monitor the downlink control information on the at least one first transmission resource, determining that the mapping manner used by the resources of the downlink data channel for the first transmission resource that is in the at least one first transmission resource and that transmits the downlink control information is the puncturing manner.

In an optional implementation, the determining a transmission mode of the downlink data channel in the resources of the downlink data channel based on the condition satisfied by the at least one first transmission resource includes: when the at least one first transmission resource satisfies the first condition and the at least one first transmission resource transmits the downlink control information, determining that redundancy versions of the first repetition and a second repetition of the downlink data channel in time domain are both first redundancy versions configured by the network device for the downlink data channel; and when the at least one first transmission resource satisfies the second condition and the at least one first transmission resource transmits the downlink control information, determining that the redundancy version of the first repetition of the downlink data channel in time domain is the first redundancy version configured by the network device for the downlink data channel, and that the redundancy version of the second repetition of the downlink data channel in time domain is a second redundancy version configured by the network device for the downlink data channel.

In an optional implementation, when the at least one first transmission resource is a plurality of first transmission resources, there are two first transmission resources corresponding to different aggregation levels in the plurality of first transmission resources.

For technical effects brought by the third aspect or the optional implementations, refer to descriptions of the technical effects brought by the first aspect or the corresponding implementations.

According to a fourth aspect, a fourth downlink transmission method is provided. The method may be performed by a network device or by a chip system, where the chip system can implement functions of the network device. For example, the network device is an access network device, for example, a base station. The method includes: configuring resources of a downlink data channel for a terminal device, where the resources of the downlink data channel include at least one first transmission resource; when the at least one first transmission resource is a plurality of first transmission resources, start positions of time domain positions of the plurality of first transmission resources are the same; and the at least one first transmission resource can be used to transmit downlink control information; and determining a transmission mode of the downlink control information and/or the downlink data channel in the resources of the downlink data channel based on a condition satisfied by the at least one first transmission resource, where the at least one first transmission resource satisfies a first condition or a second condition, the condition satisfied by the at least one first transmission resource is determined based on a time domain position of the at least one first transmission resource and time domain positions of the resources of the downlink data channel, the first condition is that the at least one first transmission resource is all located in a resource of a first repetition of the downlink data channel in time domain, and the second condition is that the at least one first transmission resource is not all located in the resource of the first repetition of the downlink data channel in time domain.

In an optional implementation, the method further includes: sending first downlink control information to the terminal device. When the at least one first transmission resource satisfies the first condition, the first downlink control information indicates that the at least one first transmission resource transmits the downlink control information, or indicates that the at least one first transmission resource does not transmit the downlink control information; or when the at least one first transmission resource satisfies the second condition, the first downlink control information indicates that the at least one first transmission resource transmits the downlink control information, or indicates that the downlink control information is monitored on the at least one first transmission resource; or when the at least one first transmission resource satisfies the second condition, the first downlink control information does not indicate that the at least one first transmission resource transmits the downlink control information, does not indicate that the at least one first transmission resource does not transmit the downlink control information, and does not indicate that the downlink control information is monitored on the at least one first transmission resource.

In an optional implementation, the determining a transmission mode of the downlink control information in the resources of the downlink data channel based on the condition satisfied by the at least one first transmission resource includes:
  when the at least one first transmission resource satisfies the first condition, determining that a quantity of CRC bits of the downlink control information transmitted in the at least one first transmission resource is a first quantity of bits; or when the at least one first transmission resource satisfies the first condition and the at least one first transmission resource transmits the downlink control information, determining that a quantity of CRC bits of the downlink control information transmitted in the at least one first transmission resource is a first quantity of bits; and
  when the at least one first transmission resource satisfies the first condition and the terminal device needs to monitor the downlink control information on the at least one first transmission resource, determining that the quantity of CRC bits of the downlink control information transmitted in the at least one first transmission resource is a second quantity of bits, where the first quantity of bits is less than the second quantity of bits.

In an optional implementation, the determining a transmission mode of the downlink control information in the resources of the downlink data channel based on the condition satisfied by the at least one first transmission resource includes: when the at least one first transmission resource satisfies the second condition, determining that the quantity of CRC bits of the downlink control information transmitted in the at least one first transmission resource is the second quantity of bits; or when the at least one first transmission resource satisfies the second condition and the at least one first transmission resource transmits the downlink control information, determining that the quantity of CRC bits of the downlink control information transmitted in the at least one first transmission resource is the first quantity of bits; or when the at least one first transmission resource satisfies the second condition and the terminal device needs to monitor the downlink control information on the at least one first transmission resource, determining that the quantity of CRC bits of the downlink control information transmitted in the at least one first transmission resource is the second quantity of bits, where the first quantity of bits is less than the second quantity of bits.

In an optional implementation, the determining a transmission mode of the downlink data channel in the resources of the downlink data channel based on the condition satisfied by the at least one first transmission resource includes: when the at least one first transmission resource satisfies the first condition, determining that a mapping manner used by the resources of the downlink data channel for a first transmission resource that is in the at least one first transmission resource and that transmits the downlink control information is a rate matching manner; or when the at least one first transmission resource satisfies the first condition and the at least one first transmission resource transmits the downlink control information, determining that a mapping manner used by the resources of the downlink data channel for a first transmission resource that is in the at least one first transmission resource and that transmits the downlink control information is a rate matching manner.

In an optional implementation, the determining a transmission mode of the downlink data channel in the resources of the downlink data channel based on the condition satisfied by the at least one first transmission resource includes: when the at least one first transmission resource satisfies the second condition, determining that the mapping manner used by the resources of the downlink data channel for the first transmission resource that is in the at least one first transmission resource and that transmits the downlink control information is a puncturing manner; or when the at least one first transmission resource satisfies the second condition and the at least one first transmission resource transmits the downlink control information, determining that the mapping manner used by the resources of the downlink data channel for the first transmission resource that is in the at least one first transmission resource and that transmits the downlink control information is the rate matching manner; or when the at least one first transmission resource satisfies the second condition and the terminal device needs to monitor the downlink control information on the at least one first transmission resource, determining that the mapping manner used by the resources of the downlink data channel for the first transmission resource that is in the at least one first transmission resource and that transmits the downlink control information is the puncturing manner.

In an optional implementation, the determining a transmission mode of the downlink data channel in the resources of the downlink data channel based on the condition satisfied by the at least one first transmission resource includes: when the at least one first transmission resource satisfies the first condition and the at least one first transmission resource transmits the downlink control information, determining that redundancy versions of the first repetition and a second repetition of the downlink data channel in time domain are both first redundancy versions configured by the network device for the downlink data channel; and when the at least one first transmission resource satisfies the second condition and the at least one first transmission resource transmits the downlink control information, determining that the redundancy version of the first repetition of the downlink data channel in time domain is the first redundancy version configured by the network device for the downlink data channel, and that the redundancy version of the second repetition of the downlink data channel in time domain is a second redundancy version configured by the network device for the downlink data channel.

In an optional implementation, when the at least one first transmission resource is a plurality of first transmission resources, there are two first transmission resources corresponding to different aggregation levels in the plurality of first transmission resources.

For technical effects brought by the fourth aspect or the optional implementations, refer to descriptions of the technical effects brought by the second aspect or the corresponding implementations.

According to a fifth aspect, a fifth downlink transmission method is provided. The method may be performed by a terminal device, may be performed by a chip system that can implement a function of the terminal device, or may be performed by a large device including a terminal device. The method includes: receiving first signaling from a network device, where the first signaling indicates whether at least one first transmission resource transmits downlink control information, where when the at least one first transmission resource is a plurality of first transmission resources, start positions of time domain positions of the plurality of first transmission resources are the same; and the at least one first transmission resource can be used to transmit downlink control information; and determining a transmission mode of the downlink control information and/or the downlink data channel in the resources of the downlink data channel based on the first signaling.

According to embodiments of this application, the downlink control information can be transmitted through the resources of the downlink data channel. In other words, resources that can transmit the downlink control information are extended. In this way, the terminal device only needs to monitor (or referred to as listening) the downlink control information in the resources that are of the downlink data channel and that are configured for the terminal device. While downlink control information sending performance of the terminal device is ensured as much as possible, a quantity of times that the terminal device monitors the downlink control channel in preset resources can be reduced, power consumption of the terminal device can be reduced, and a receiving delay of the downlink control information can also be reduced. In addition, in embodiments of this application, the network device may send the first signaling, to indicate whether the at least one first transmission resource transmits the downlink control information. In this case, the terminal device can determine, based on the first signaling, whether the at least one first transmission resource transmits the downlink control information. Therefore, a probability of an error monitored by the terminal device can be reduced. In addition, the first downlink control information may further indicate that the downlink control information is monitored on the at least one first transmission resource, that is, may indicate such an uncertain case. This considers different generation times of the downlink control information. "Monitoring (or listening)" is different from "detecting", where "monitoring" focuses on describing a process of monitoring the downlink control information by the terminal device, and a monitoring result may be that the downlink control information is detected, or may be that the downlink control information cannot be detected. "Detecting" focuses more on describing a result, for example, "downlink control information is detected".

In an optional implementation, the determining a transmission mode of the downlink control information in the resources of the downlink data channel based on the first signaling includes: when the first signaling indicates that the at least one first transmission resource transmits the downlink control information, determining that a quantity of CRC bits of the downlink control information transmitted in the at least one first transmission resource is a first quantity of bits; and when the first signaling indicates that the downlink control information is monitored on the at least one first transmission resource, determining that the quantity of CRC bits of the downlink control information transmitted in the at least one first transmission resource is a second quantity of bits, where the first quantity of bits is less than the second quantity of bits.

If it is determined that the downlink control information is transmitted in a group of transmission resources, the quantity of CRC bits may be smaller, to reduce transmission overheads. If it is not determined whether the downlink control information is transmitted in a group of transmission resources, the quantity of CRC bits needs to be larger, to reduce a probability of an error in monitoring the downlink control information.

In an optional implementation, the determining a transmission mode of the downlink data channel in the resources of the downlink data channel based on the first signaling includes: when the first signaling indicates that the at least one first transmission resource transmits the downlink control information, determining that a mapping manner used by the resources of the downlink data channel for a first transmission resource that is in the at least one first transmission resource and that transmits the downlink control information is a rate matching manner; or when the first signaling indicates that the downlink control information is monitored on the at least one first transmission resource and downlink control information is detected in the at least one first transmission resource, determining that a mapping manner used by the resources of the downlink data channel for a first transmission resource that is in the at least one first transmission resource and that transmits the downlink control information is a puncturing manner.

If it is determined that a group of transmission resources is to transmit the downlink control information, performance of rate matching is better than that of puncturing. Therefore, if it is determined that the at least one first transmission resource transmits the downlink control information, the mapping manner used by the resources of the downlink data channel for the first transmission resource that is in the at least one first transmission resource and that transmits the downlink control information may be the rate matching manner. However, if it is not determined whether the at least one first transmission resource transmits the downlink control information, for example, whether the at least one first transmission resource transmits the downlink control information is determined only through blind detection is performed, the puncturing manner can ensure as much as possible that mapping of resources that are used to transmit the downlink data channel and that are in the resources of the downlink data channel is correct whether a result of the blind detection is correct or not. Therefore, when an error may occur during the blind detection, performance of puncturing is better than that of rate matching. Therefore, if the first signaling indicates that the downlink control information is monitored on the at least one first transmission resource, the mapping manner used by the resources of the downlink data channel for the first transmission resource that is in the at least one first transmission resource and that transmits the downlink control information is the puncturing manner.

In an optional implementation, the determining a transmission mode of the downlink data channel in the resources of the downlink data channel based on the first signaling includes: when the first signaling indicates that the at least one first transmission resource transmits the downlink control information, determining that redundancy versions of the first repetition and a second repetition of the downlink data channel in time domain are both first redundancy versions configured by the network device for the downlink data channel; or when the first signaling indicates that the network device indicates that the downlink control information is monitored on the at least one first transmission resource, determining that the redundancy version of the first repetition of the downlink data channel in time domain is the first redundancy version configured by the network device for the downlink data channel, and that the redundancy version of the second repetition of the downlink data channel in time domain is a second redundancy version configured by the network device for the downlink data channel; or when the first signaling indicates that the network device indicates that the at least one first transmission resource does not transmit the downlink control information, determining that the redundancy version of the first repetition of the downlink data channel in time domain is the first redundancy version configured by the network device for the downlink data channel, and that the redundancy version of the second repetition of the downlink data channel in time domain is a second redundancy version configured by the network device for the downlink data channel.

If the at least one first transmission resource transmits the downlink control information, and the at least one first transmission resource is located in a resource of a first repetition of the downlink data channel in time domain, because the at least one first transmission resource transmits the downlink control information, the downlink control information occupies specific bits. As a result, complete system bits may not be transmitted in the first repetition of the downlink data channel in time domain. In this case, if the terminal device receives a transport block that does not include the complete system bits, self-decoding may not be performed, and original information cannot be obtained. Therefore, in this case, the redundancy versions of the first repetition and the second repetition of the downlink data channel in time domain may be the first redundancy versions configured by the network device for the downlink data channel. For example, a transport block transmitted by using the redundancy version may include the system bits. In this case, even if the first repetition of the downlink data channel in time domain cannot include the complete system bits due to transmission of the downlink control information, the redundancy version of the second repetition of the downlink data channel in time domain is also the redundancy version. In this case, the second repetition of the downlink data channel in time domain may include the complete system bits. In this case, the terminal device can also perform self-decoding based on the transport block transmitted in the second repetition of the downlink data channel in time domain, to obtain the original information, so that a probability of correct decoding by the terminal device is increased. If the at least one first transmission resource may transmit the downlink control information, or the at least one first transmission resource does not transmit the downlink control information, there is a high probability that the first repetition of the downlink data channel in time domain can include the complete system bits. Therefore, in this case, the redundancy version of the first repetition of the downlink data channel in time domain may be the first redundancy version configured by the network device for the downlink data channel. For example, a transport block transmitted by using the first version may include the system bits. However, other repetitions of the downlink data channel in time domain may not all use the redundancy version. For example, the second repetition of the downlink data channel in time domain may use the second redundancy version configured by the network device for the downlink data channel. A third repetition of the downlink data channel in time domain may use a third redundancy version configured by the network device for the downlink data channel, and so on. In this way, the technical solutions in embodiments of this application can be better compatible with a current technology.

In an optional implementation, the first signaling is RRC signaling, a MAC CE, or downlink control information.

In addition, the first signaling may alternatively be implemented through other signaling. This is not limited in embodiments of this application.

In an optional implementation, when the at least one first transmission resource is a plurality of first transmission resources, there are two first transmission resources corresponding to different aggregation levels in the plurality of first transmission resources.

If the at least one transmission resource includes a plurality of first transmission resources, there may be two first transmission resources corresponding to different aggregation levels in the plurality of first transmission resources. For example, different first transmission resources in the plurality of first transmission resources correspond to different aggregation levels. In other words, the aggregation levels are in a one-to-one correspondence with the first transmission resources. Alternatively, in the plurality of first transmission resources, there may be two first transmission resources corresponding to a same aggregation level, and there are also two first transmission resources corresponding to different aggregation levels.

According to a sixth aspect, a sixth downlink transmission method is provided. The method may be performed by a network device or by a chip system, where the chip system can implement functions of the network device. For example, the network device is an access network device, for example, a base station. The method includes: configuring resources of a downlink data channel for a terminal device, where the resources of the downlink data channel include at least one first transmission resource; when the at least one first transmission resource is a plurality of first transmission resources, start positions of time domain positions of the plurality of first transmission resources are the same; and the at least one first transmission resource can be used to transmit downlink control information; and sending first signaling to the terminal device, where the first signaling indicates whether the at least one first transmission resource transmits the downlink control information, and the first signaling is for determining a transmission mode of the downlink control information and/or the downlink data channel in the resources of the downlink data channel.

In an optional implementation, that the first signaling is for determining a transmission mode of the downlink control information in the resources of the downlink data channel includes: A quantity of CRC bits of the downlink control information transmitted in the at least one first transmission resource is a first quantity of bits when the first signaling indicates that the at least one first transmission resource transmits the downlink control information; and the quantity of CRC bits of the downlink control information transmitted in the at least one first transmission resource is a second quantity of bits when the first signaling indicates that the downlink control information is monitored on the at least one first transmission resource, where the first quantity of bits is less than the second quantity of bits.

In an optional implementation, that the first signaling is for determining a transmission mode of the downlink data channel in the resources of the downlink data channel includes: A mapping manner used by the resources of the downlink data channel for a first transmission resource that is in the at least one first transmission resource and that transmits the downlink control information is a rate matching manner when the first signaling indicates that the at least one first transmission resource transmits the downlink control information; or a mapping manner used by the resources of the downlink data channel for a first transmission resource that is in the at least one first transmission resource and that transmits the downlink control information is a puncturing manner when the first signaling indicates that the downlink control information is monitored on the at least one first transmission resource and downlink control information is transmitted in the at least one first transmission resource.

In an optional implementation, that the first signaling is for determining a transmission mode of the downlink data channel in the resources of the downlink data channel includes: Redundancy versions of the first repetition and a second repetition of the downlink data channel in time domain are both first redundancy versions configured by the network device for the downlink data channel when the first signaling indicates that the at least one first transmission resource transmits the downlink control information; or when the first signaling indicates that the network device indicates that the downlink control information is monitored on the at least one first transmission resource, the redundancy version of the first repetition of the downlink data channel in time domain is the first redundancy version configured by the network device for the downlink data channel, and the redundancy version of the second repetition of the downlink data channel in time domain is a second redundancy version configured by the network device for the downlink data channel; or when the first signaling indicates that the network device indicates that the at least one first transmission resource does not transmit the downlink control information, the redundancy version of the first repetition of the downlink data channel in time domain is the first redundancy version configured by the network device for the downlink data channel, and the redundancy version of the second repetition of the downlink data channel in time domain is a second redundancy version configured by the network device for the downlink data channel.

In an optional implementation, the first signaling is RRC signaling, a MAC CE, or downlink control information.

In an optional implementation, when the at least one first transmission resource is a plurality of first transmission resources, there are two first transmission resources corresponding to different aggregation levels in the plurality of first transmission resources.

For technical effects brought by the sixth aspect or the optional implementations, refer to descriptions of the technical effects brought by the fifth aspect or the corresponding implementations.

According to a seventh aspect, a communication apparatus is provided. The communication apparatus may be the terminal device according to any one of the first to sixth aspects, or an electronic device (for example, a chip system) configured in the terminal device, or a large device including the terminal device. The terminal device includes a corresponding means or modules configured to perform the foregoing method. For example, the communication apparatus includes a processing unit (or referred to as a processing module) and a transceiver unit (or referred to as a transceiver module).

The processing unit is configured to determine a time domain position of at least one first transmission resource in resources of a downlink data channel, where when the at least one first transmission resource is a plurality of first transmission resources, start positions of time domain positions of the plurality of first transmission resources are the same; and the at least one first transmission resource can be used to transmit downlink control information. The processing unit is further configured to determine, based on the time domain position of the at least one first transmission resource and time domain positions of the resources of the downlink data channel, a condition satisfied by the at least one first transmission resource, where the condition satisfied by the at least one first transmission resource includes a first condition or a second condition, the first condition is that a start position of the time domain position of the at least one first transmission resource is earlier than a first time domain position, and the second condition is that the start position of the time domain position of the at least one first transmission resource is the same as or later than the first time domain position, where the first time domain position is a position offset by a first time interval from a start position of the time domain positions of the resources of the downlink data channel, and the first time domain position is the same as or later than the start position of the time domain positions of the resources of the downlink data channel. The processing unit is further configured to determine a transmission mode of the downlink control information and/or the downlink data channel in the resources of the downlink data channel based on the condition satisfied by the at least one first transmission resource.

Alternatively, the processing unit is configured to determine a time domain position of at least one first transmission resource in resources of a downlink data channel, where when the at least one first transmission resource is a plurality of first transmission resources, start positions of time domain positions of the plurality of first transmission resources are the same; and the at least one first transmission resource can be used to transmit downlink control information. The processing unit is further configured to determine, based on the time domain position of the at least one first transmission resource and time domain positions of the resources of the downlink data channel, a condition satisfied by the at least one first transmission resource, where the condition satisfied by the at least one first transmission resource includes a first condition or a second condition, the first condition is that the at least one first transmission resource is all located in a resource of a first repetition of the downlink data channel in time domain, and the second condition is that the at least one first transmission resource is not all located in the resource of the first repetition of the downlink data channel in time domain. The processing unit is further configured to determine a transmission mode of the downlink control information and/or the downlink data channel in the resources of the downlink data channel based on the condition satisfied by the at least one first transmission resource.

Alternatively, the transceiver unit is configured to receive first signaling from a network device, where the first signaling indicates whether at least one first transmission resource transmits downlink control information, where when the at least one first transmission resource is a plurality of first transmission resources, start positions of time domain positions of the plurality of first transmission resources are the same; and the at least one first transmission resource can be used to transmit downlink control information. The processing unit is configured to determine a transmission mode of the downlink control information and/or the downlink data channel in the resources of the downlink data channel based on the first signaling.

For another example, the communication apparatus includes: a processor, coupled to a memory and configured to execute instructions in the memory, to implement the method performed by the terminal device in any one of the first to sixth aspects. Optionally, the communication apparatus further includes other component, for example, an antenna, an input/output module, and an interface. Such components may be hardware, software, or a combination of software and hardware.

According to an eighth aspect, a communication apparatus is provided. The communication apparatus may be the network device according to any one of the first to sixth aspects. The communication apparatus has functions of the foregoing network device. The network device is, for example, a base station or a baseband apparatus in a base station. In an optional implementation, the communication apparatus includes a baseband apparatus and a radio frequency apparatus. In another optional implementation, the communication apparatus includes a processing unit (or referred to as a processing module) and a transceiver unit (or referred to as a transceiver module).

The processing unit is configured to configure resources of a downlink data channel for a terminal device, where the resources of the downlink data channel include at least one first transmission resource; when the at least one first transmission resource is a plurality of first transmission resources, start positions of time domain positions of the plurality of first transmission resources are the same; and the at least one first transmission resource can be used to transmit downlink control information. The processing unit is further configured to determine a transmission mode of the downlink control information and/or the downlink data channel in the resources of the downlink data channel based on a condition satisfied by the at least one first transmission resource, where the at least one first transmission resource satisfies a first condition or a second condition, the condition satisfied by the at least one first transmission resource is determined based on a time domain position of the at least one first transmission resource and time domain positions of the resources of the downlink data channel, the first condition is that a start position of the time domain position of the at least one first transmission resource is earlier than a first time domain position, and the second condition is that the start position of the time domain position of the at least one first transmission resource is the same as or later than the first time domain position, where the first time domain position is a position offset by a first time interval from a start position of the time domain positions of the resources of the downlink data channel, and the first time domain position is the same as or later than the start position of the time domain positions of the resources of the downlink data channel.

Alternatively, the processing unit is configured to configure resources of a downlink data channel for a terminal device, where the resources of the downlink data channel include at least one first transmission resource; when the at least one first transmission resource is a plurality of first transmission resources, start positions of time domain positions of the plurality of first transmission resources are the same; and the at least one first transmission resource can be used to transmit downlink control information. The processing unit is further configured to determine a transmission mode of the downlink control information and/or the downlink data channel in the resources of the downlink data channel based on a condition satisfied by the at least one first transmission resource, where the at least one first transmission resource satisfies a first condition or a second condition, the condition satisfied by the at least one first transmission resource is determined based on a time domain position of the at least one first transmission resource and time domain positions of the resources of the downlink data channel, the first condition is that the at least one first transmission resource is all located in a resource of a first repetition of the downlink data channel in time domain, and the second condition is that the at least one first transmission resource is not all located in the resource of the first repetition of the downlink data channel in time domain.

Alternatively, the processing unit is configured to configure resources of a downlink data channel for a terminal device, where the resources of the downlink data channel include at least one first transmission resource; when the at least one first transmission resource is a plurality of first transmission resources, start positions of time domain positions of the plurality of first transmission resources are the same; and the at least one first transmission resource can be used to transmit downlink control information. The transceiver unit is configured to send first signaling to the terminal device, where the first signaling indicates whether the at least one first transmission resource transmits the downlink control information, and the first signaling is for determining a transmission mode of the downlink control information and/or the downlink data channel in the resources of the downlink data channel.

In still another optional implementation, the communication apparatus includes a storage unit and a processing unit. The processing unit is configured to be coupled to the storage unit, and execute a program or instructions in the storage unit, to enable the communication apparatus to implement a function of the foregoing network device.

According to a ninth aspect, a computer-readable storage medium is provided. The computer-readable storage medium is configured to store a computer program or instructions. When the computer program or the instructions are run, the method performed by the terminal device or the network device in the foregoing aspects is implemented.

According to a tenth aspect, a computer program product including instructions is provided. When the instructions are run on a computer, the method according to the foregoing aspects is implemented.

DESCRIPTION OF EMBODIMENTS

Figure 1:
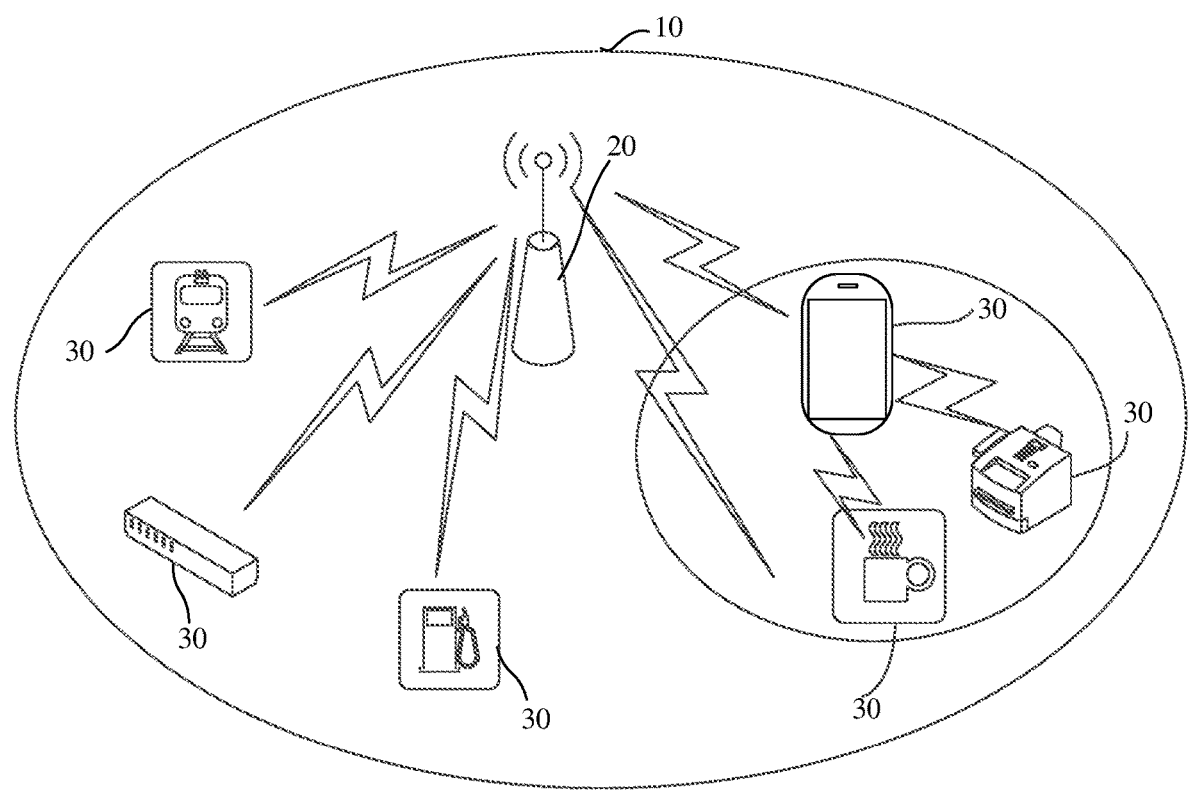
FIG. 1 is a schematic diagram of a communication system according to an embodiment of this application.

A technology provided in embodiments of this application may be applied to a communication system 10 shown in FIG. 1. The communication system 10 includes one or more communication apparatuses 30 (for example, a terminal device), where the one or more communication apparatuses 30 are connected to one or more core network devices through one or more access network devices 20, to implement communication between a plurality of communication devices. The communication system may be, for example, a communication system supporting a 4G or 5G (or referred to as new radio, NR) access technology, a cellular system related to the 3rd generation partnership project (3GPP), a communication system supporting convergence of various radio technologies, or a future-oriented evolved system.

In the following descriptions, some terms in embodiments of this application are described, to help a person skilled in the art have a better understanding.

In embodiments of this application, a terminal device is a device with a wireless transceiver function, and may be a fixed device, a mobile device, a handheld device (for example, a mobile phone), a wearable device, an in-vehicle device, or a wireless apparatus (for example, a communication module, a modem, or a chip system) built in the foregoing device. The terminal device is configured to connect to a person, an object, a machine, or the like, and may be widely applied to various scenarios, for example, including but not limited to the following scenarios: terminal devices in scenarios such as cellular communication, device-to-device communication (D2D), vehicle to everything (V2X), machine-to-machine/machine-type communication (M2M/MTC), Internet of things (IoT), virtual reality (VR), augmented reality (AR), industrial control, self driving, remote medical, smart grid, smart furniture, smart office, smart wear, smart transportation, smart city, unmanned aerial vehicles, and robots. The terminal device may also be referred to as user equipment (UE), a terminal, an access station, a UE station, a remote station, a wireless communication device, a user apparatus, or the like. For ease of description, an example in which the terminal device is UE is used for description in this embodiment of this application.

A network device in embodiments of this application includes, for example, an access network device and/or a core network device. The access network device is a device with a wireless transceiver function, and is configured to communicate with the terminal device. The access network device includes but is not limited to a base station (for example, a base transceiver station (BTS), a NodeB, an evolved NodeB (eNodeB/eNB), or a next generation nodeB (gNodeB/gNB), or a transmission reception point (TRP) in the foregoing communication system, a base station subsequently evolved from a 3rd generation partnership project (3GPP), an access node in a wireless fidelity (Wi-Fi) system, a wireless relay node, a wireless backhaul node, or the like. The base station may be a macro base station, a micro base station, a picocell base station, a small cell, a relay station, or the like. A plurality of base stations may support networks of a same access technology described above, or may support networks of different access technologies described above. The base station may include one or more co-site or non-co-site transmission and receiving points. Alternatively, the network device may be a radio controller, a central unit (CU), and/or a distributed unit (DU) in a cloud radio access network (CRAN) scenario. Alternatively, the network device may be a server, a wearable device, an in-vehicle device, or the like. For example, a network device in the vehicle to everything (V2X) technology may be a roadside unit (RSU). The following describes an example in which the access network device is a base station. A plurality of network devices in the communication system may be base stations of a same type, or may be base stations of different types. The base station may communicate with the terminal device, or may communicate with the terminal device through a relay station. The terminal device may communicate with a plurality of base stations in different access technologies. The core network device is configured to implement functions such as mobility management, data processing, session management, policy and charging. Names of devices that implement core network functions in systems of different access technologies may be different. This is not limited in this application. A 5G system is used as an example, and the core network device includes: an access and mobility management function (AMF), a session management function (SMF), a user plane function (UPF), and the like.

In embodiments of this application, a communication apparatus configured to implement functions of the network device may be a network device, or may be an apparatus, for example, a chip system, that can support the network device in implementing the functions. The apparatus may be installed in the network device. In the technical solutions provided in embodiments of this application, the technical solutions provided in embodiments of this application are described by using an example in which the apparatus configured to implement the function of the network device is the network device.

In embodiments of this application, unless otherwise specified, a quantity of nouns represents "singular noun or plural nouns", namely, "one or more". "At least one" means one or more, and "a plurality of" means two or more. The term "and/or" is an association relationship for describing associated objects and represents that three relationships may exist. For example, A and/or B may represent the following three cases: Only A exists, both A and B exist, and only B exists, where A and B may be singular or plural. The character "/" usually indicates an "or" relationship between associated objects. For example, A/B indicates: A or B. At least one of the following items (pieces) or a similar expression thereof refers to any combination of these items, including any combination of singular items (pieces) or plural items (pieces). For example, at least one of a, b, or c indicates: a, b, c, a and b, a and c, b and c, or a, b, and c, where a, b, and c may be singular or plural.

In embodiments of this application, ordinal numbers such as "first" and "second" are used to distinguish a plurality of objects, but are not used to limit sizes, content, sequences, time sequences, priorities, or importance levels of the plurality of objects. For example, a first condition and a second condition may be a same condition, or may be different conditions. In addition, the names do not indicate different content, priorities, or importance levels of the two conditions.

Embodiments of this application relates to some basic concepts, such as an aggregation level (AL), a cyclic redundancy check (CRC), a resource mapping manner (for example, rate matching or puncturing), and a redundancy version (RV). For ease of understanding, such basic concepts are briefly described before the technical solutions provided in embodiments of this application are described.

1. Aggregation Level

For example, in an NR system, one PDCCH may include L={1, 2, 4, 8, 16} control channel elements (CCEs), where L herein is referred to as an aggregation level of the PDCCH. One CCE includes six resource-element groups (REGs), and each REG corresponds to one resource block (RB) on one orthogonal frequency division multiplexing (OFDM) symbol. One PDCCH candidate may include L={1, 2, 4, 8, 16} CCEs, and one PDCCH candidate may send a PDCCH of one UE, or may not send a PDCCH. The UE may monitor the PDCCH candidate to determine whether there is a PDCCH to be sent to the UE.

2. CRC

A CRC code is a common check code. The CRC code can be used to detect transmission errors.

Generally, an information transmit end generates a CRC code based on to-be-transmitted information, and then transmits the to-be-transmitted information and the CRC code together. An information receiving end checks the received information together with the received CRC code. If the check succeeds, it is considered that transmission exists and the transmission is correct. If the check fails, it is considered that there is no transmission or there is a transmission error.

In addition, in some scenarios, errors occur during transmission, but the CRC succeeds. In other scenarios, the transmission does not exist but the CRC is correct. In such cases, the CRC is considered to be incorrect. A probability of CRC errors is related to a length of the CRC code. Generally, the longer the CRC code, the lower the probability of CRC errors.

3. Transport Block Transmission Process

Figure 2:
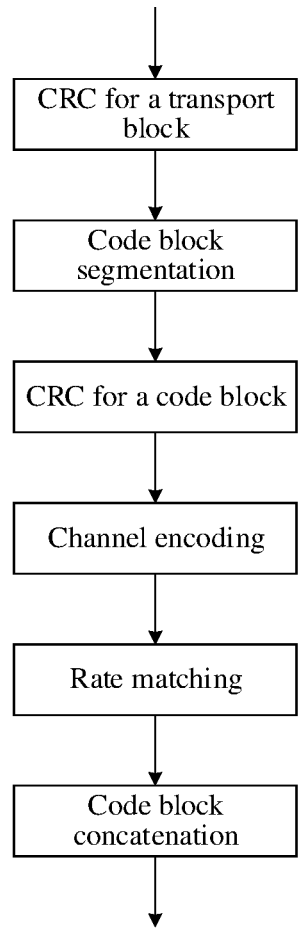
FIG. 2 is a schematic diagram of a data sending process.

In an NR system, a data channel transport block at a physical layer needs to undergo a coding process shown in FIG. 2. A data channel at the physical layer is, for example, a physical downlink shared channel (PDSCH). It can be learned from FIG. 2 that, an information transmit end may add a CRC code to a transport block (TB), segment the transport block to which the CRC code is added into one or more code blocks, and then add a CRC code to the code block obtained through segmentation. Channel coding is then performed on the code block to which the CRC code is added. After channel coding, obtained information is mapped, for example, mapped in a rate matching manner, and code block concatenation is then performed. Finally, sending may be completed.

4. Rate Matching and Puncturing

Figure 3:
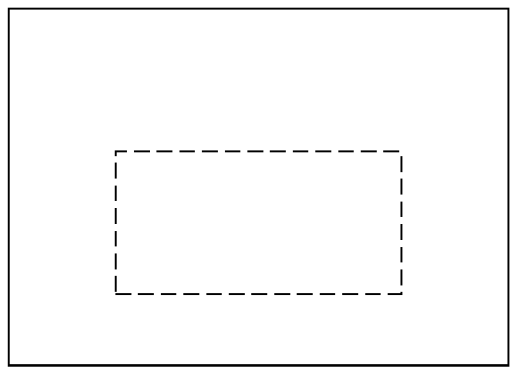
FIG. 3 is a schematic diagram of a resource for transmitting a PDSCH.

As shown in FIG. 3, time-frequency resources in a solid-line box in FIG. 3 are allocated to a PDSCH for transmission, but time-frequency resources in a dashed-line box in the solid-line box cannot be used by the PDSCH due to some reasons. In this case, the PDSCH can actually be transmitted only on time-frequency resources in the solid-line box and outside the dashed-line box.

It can be learned from FIG. 2 that, after channel coding, the PDSCH needs to be mapped. There are two mapping manners for mapping the PDSCH to the time-frequency resources in the solid-line box and outside the dashed-line box:

(1) Rate matching: It is considered that air interface resources include only the time-frequency resources in the solid-line box and outside the dashed-line box. Data selection after encoding is performed, and selected data, after being modulated, exactly corresponds to the time-frequency resources in the solid-line box and outside the dashed-line box. This is a rate matching process.

2. Puncturing It is considered that air interface resources include all time-frequency resources in the solid-line box. Data selection after encoding is performed, and selected data, after being modulated, corresponds to the time-frequency resources in the solid-line box. The data in the dashed-line box is then cut out. In other words, modulation symbols that should be mapped in the dashed-line box are set to 0, to complete puncturing. The modulation symbol is, for example, quadrature phase shift keying (QPSK), 16-symbol quadrature amplitude modulation (16QAM), 64QAM, or 256QAM, and each modulation symbol carries a plurality of bits. That the modulation symbols that should be mapped in the dashed-line box are set to 0 may be understood as: no modulation symbol is sent on resources on which the modulation symbols should be sent in the dashed-line box.

In this example, an information receiving end is UE. If the UE determines that the time-frequency resources that cannot be used for PDSCH transmission in the dashed-line box certainly exist, performance of rate matching is better than that of puncturing. If the UE cannot determine whether a time-frequency resource that cannot be used for PDSCH transmission exists in the solid-line box, for example, the UE needs to perform blind detection on a PDCCH to determine whether a time-frequency resource that cannot be used for PDSCH transmission exists in the solid-line box, puncturing can ensure that mapping of the time-frequency resources in the solid-line box and outside the dashed-line box in FIG. 3 is correct regardless of whether a result of blind detection performed by the UE is correct. Therefore, performance of puncturing is better than that of rate matching when an error occurs during blind detection of the information receiving end.

5. RV

One PDSCH transmission may include a plurality of repetitions. Each repetition may be used to transmit same transport blocks, but RVs of the transport blocks transmitted in different repetitions may be different. For example, if an RV configured by a network device for a PDSCH is {0, 2, 3, 1}, an RV of a first repetition in time domain included in the PDSCH is 0, an RV of a second repetition in time domain is 2, an RV of a third repetition in time domain is 3, an RV of a fourth repetition in time domain is 1, an RV of a fifth repetition in time domain is 0, an RV of a sixth repetition in time domain is 2, and so on. The first repetition, the second repetition, and the like herein refer to sorting performed in a time domain sequence. For example, a time domain position of the first repetition is earlier than a time domain position of the second repetition. Generally, the RV of the first repetition of the PDSCH in time domain includes system bits. If the information receiving end receives a transport block transmitted in the first repetition, the information receiving end may perform self-decoding on the transport block. The so-called self-decoding means that decoding may be successful based on the RV without combining another RV. Information bits before mother code coding are referred to as system bits.

It is considered that when DCI is sent through a PDCCH, the UE may need to monitor the PDCCH in a large quantity of preset resources, increasing power consumption of the UE and increasing a receiving delay of the DCI. Therefore, according to embodiments of this application, the downlink control information can be transmitted through the resources of the downlink data channel. In other words, resources that can transmit the downlink control information are extended. In this way, the UE only needs to monitor the DCI in resources of a downlink data channel scheduled for the UE. While DCI sending performance of the UE is ensured as much as possible, a quantity of times that the UE monitors the PDCCH in the preset resources can be reduced, power consumption of the UE can be reduced, and the receiving delay of the DCI is also reduced. In addition, in embodiments of this application, the condition satisfied by the at least one first transmission resource can be determined based on the time domain position of the at least one first transmission resource that is in the resources of the downlink data channel and that can transmit the downlink control information. Therefore, the transmission mode of the downlink control information and/or the downlink data channel in the resources of the downlink data channel can be determined. In other words, an implementation of transmitting the downlink control information in the resources of the downlink data channel is provided.

Figure 4A:
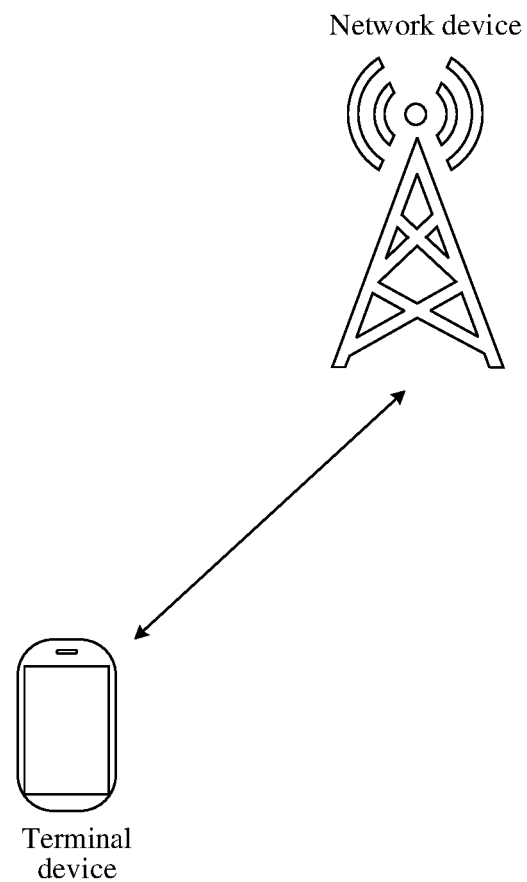
FIG. 4A is a schematic diagram of an application scenario according to an embodiment of this application.

FIG. 4A shows a communication network architecture in the communication system 10 according to an embodiment of this application. Any subsequent embodiment shown in FIG. 5 or FIG. 7 may be applicable to the architecture. A network device included in FIG. 4A is, for example, the access network device 20 included in the communication system 10, and a terminal device included in FIG. 4A is, for example, the communication apparatus 30 included in the communication system 10. The network device can communicate with the terminal device.

Figure 4B:
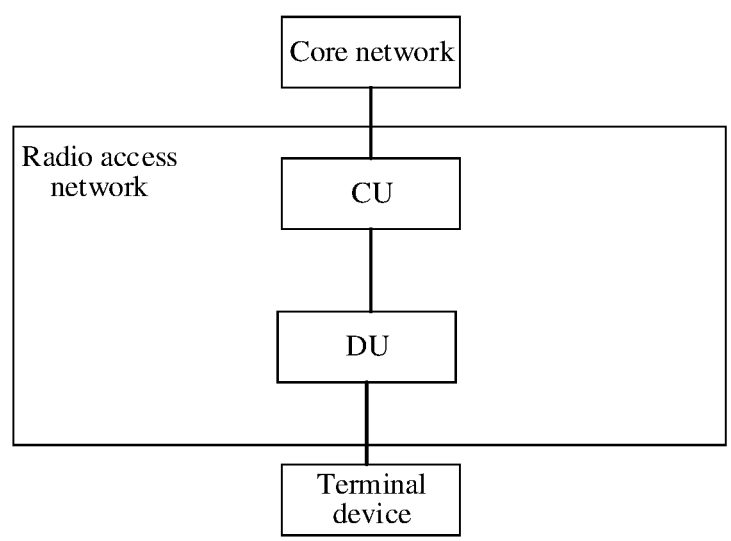
FIG. 4B is a schematic diagram of another application scenario according to an embodiment of this application.

FIG. 4B shows another communication network architecture in the communication system 10 according to an embodiment of this application. As shown in FIG. 4B, the communication system includes a core network (CN) and a radio access network (RAN). A network device (for example, a base station) in the RAN is, for example, the access network device 20 in the communication system 10. The network device in the RAN includes a baseband apparatus and a radio frequency apparatus. The baseband apparatus may be implemented by one or more nodes, and the radio frequency apparatus may be remotely and independently implemented from the baseband apparatus, or may be integrated into the baseband apparatus, or may be partly remotely implemented from and partly integrated into the baseband apparatus. The network device in the RAN may include a CU and a DU. If there are a plurality of DUs, the plurality of DUs may be centrally controlled by one CU. The CU and the DU may be divided based on protocol layer functions of wireless networks thereof. For example, functions of a packet data convergence protocol (PDCP) and a protocol layer above the PDCP layer are set in the CU, and functions of protocol layers below the PDCP layer, for example, a radio link control (radio link control, RLC) layer and a media access control (MAC) layer, are set in the DU. It should be noted that, such protocol layer division is merely an example, and there may be division of other protocol layers. The radio frequency apparatus may be remotely disposed and not placed in the DU, or may be integrated into the DU, or may be partly remotely disposed and partly integrated into the DU. This is not limited in embodiments of this application.

Figure 4C:
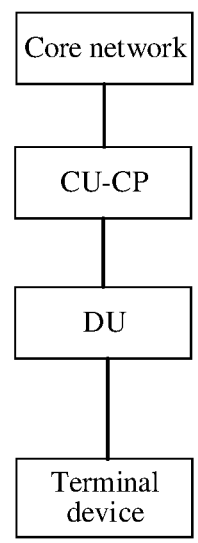
FIG. 4C is a schematic diagram of still another application scenario according to an embodiment of this application.

FIG. 4C shows another communication network architecture in the communication system 10 according to an embodiment of this application. Compared with the architecture shown in FIG. 4B, a control plane (CP) and a user plane (UP) of the CU may be separated and divided into different entities for implementation, including a control plane CU entity (a CU-CP entity) and a user plane CU entity (a CU-UP entity). In this network architecture, signaling generated by the CU may be sent to the terminal device through the DU, or signaling generated by the terminal device may be sent to the CU through the DU. The DU may transparently transmit the signaling to the terminal device or the CU by directly encapsulating the signaling at a protocol layer without parsing the signaling. In this network architecture, the CU is classified as a network device on the RAN side. In addition, the CU may alternatively be classified as a network device on the CN side. This is not limited in embodiments of this application.

The following describes a method provided in embodiments of this application with reference to the accompanying drawings. In embodiments of this application, a downlink data channel is, for example, a downlink data channel at a physical layer, for example, a PDSCH, or may be a downlink data channel at another layer, for example, a downlink data channel at a MAC layer. A downlink control channel is, for example, a downlink control channel at a physical layer, for example, a PDCCH, or a downlink control channel may be a downlink control channel at another layer, for example, a downlink control channel at a MAC layer. Downlink control information is, for example, downlink control information of a physical layer, for example, DCI, or downlink control information may have another name. In descriptions of the following embodiments, if an example is taken in which a downlink control channel is a PDCCH, a downlink data channel is a PDSCH, and downlink control information is DCI, an example is taken in which resources of the downlink data channel are resources of the PDSCH. In other words, all PDCCHs described below can be replaced with downlink control channels, all PDSCHs described below can be replaced with downlink data channels, and all DCI described below can be replaced with downlink control information. In addition, in the accompanying drawings corresponding to embodiments of this application, steps represented by dashed lines are all optional steps.

Figure 5:
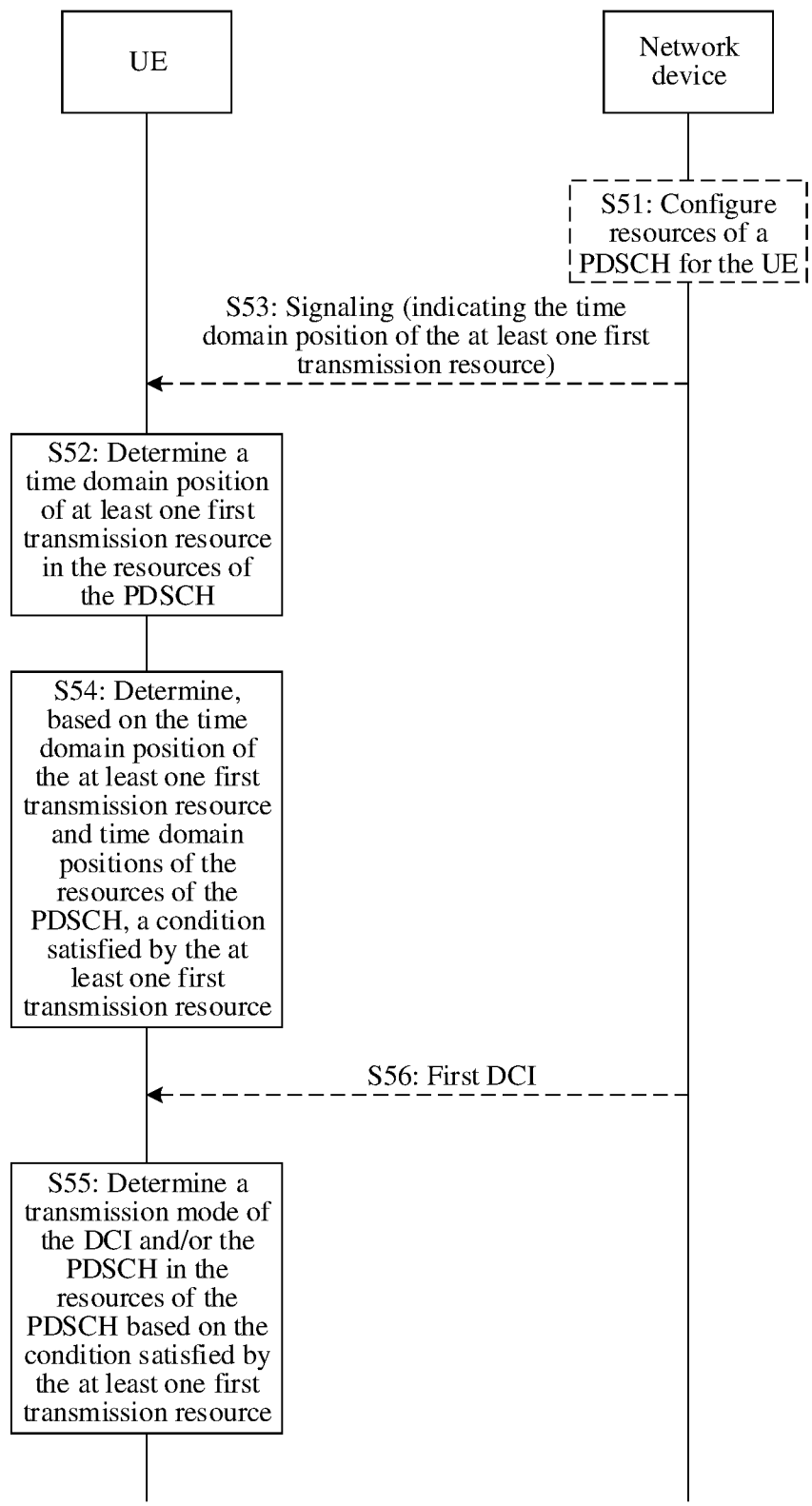
FIG. 5 is a flowchart of a downlink transmission method according to an embodiment of this application.

Refer to FIG. 5. A downlink transmission method according to an embodiment of this application is provided.

S51: A network device configures resources of a PDSCH for UE.

For example, the resources of the PDSCH include one or more groups of transmission resources. The one or more groups of transmission resources can be used to transmit DCI. In other words, the one or more groups of transmission resources are candidate resources for transmitting DCI. For example, the one or more groups of transmission resources include one group of transmission resources, and the group of transmission resources includes at least one first transmission resource. Start positions of time domain positions of different first transmission resources in the at least one first transmission resource are the same, end positions of the time domain positions of the different first transmission resources may be the same or may be different, but sizes of time-frequency resources of different first transmission resources are different. Other transmission resources in the resources of the PDSCH than the one or more groups of transmission resources are not used to transmit DCI, but may be used to transmit the PDSCH. Certainly, although the one or more groups of transmission resources may be used to transmit DCI, the DCI may not necessarily be transmitted. It only means that the one or more groups of transmission resources have a capability or performance of transmitting DCI.

Considering that a PDCCH in an NR system corresponds to an aggregation level, one group of transmission resources in the one or more groups of transmission resources included in the resources of the PDSCH may include one transmission resource (or referred to as a block of transmission resource), or include a plurality of transmission resources. One transmission resource may be understood as a minimum resource element that can be used to transmit DCI. For example, the at least one first transmission resource is one of the one or more groups of transmission resources, and a quantity of the at least one first transmission resource may be 1, or may be greater than 1. If the at least one transmission resource includes a plurality of first transmission resources, there may be two first transmission resources corresponding to different aggregation levels in the plurality of first transmission resources. For example, different first transmission resources in the plurality of first transmission resources correspond to different aggregation levels. In other words, the aggregation levels are in a one-to-one correspondence with the first transmission resources. Alternatively, in the plurality of first transmission resources, there may be two first transmission resources corresponding to a same aggregation level, and there are also two first transmission resources corresponding to different aggregation levels.

Figure 6:
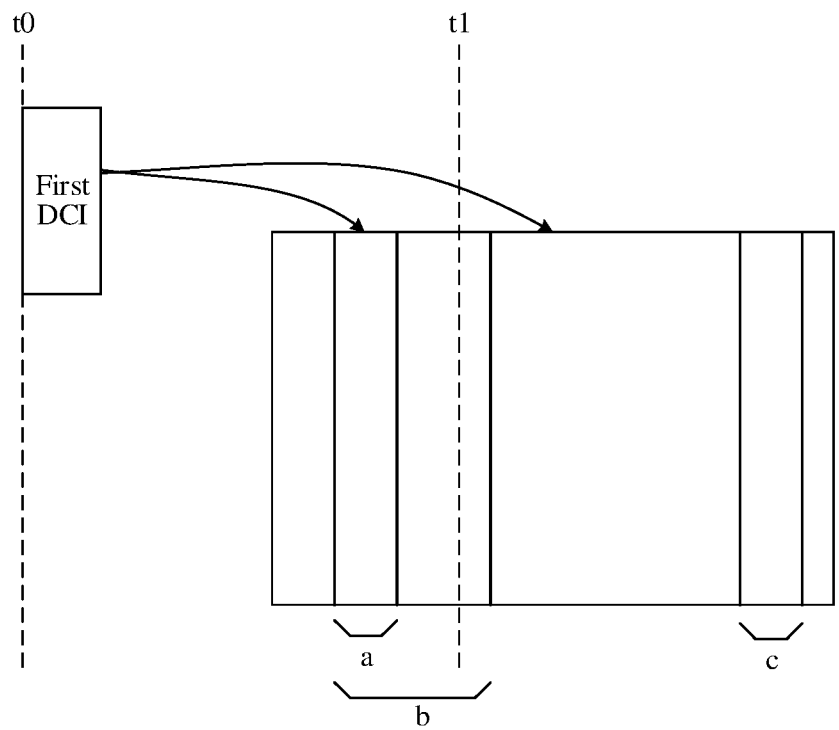
FIG. 6 is a schematic diagram of a transmission resource according to an embodiment of this application.

For example, referring to FIG. 6, a solid-line box on the right in FIG. 6 represents resources of a PDSCH. In FIG. 6, two rectangular blocks are numbered a and b. Start positions of time domain positions of the two rectangular blocks are the same, but sizes of time-frequency resources thereof are different. An end position of the time domain position of the rectangular block numbered b is later than an end position of the time domain position of the rectangular block numbered a. The two rectangular blocks are two transmission resources included in a group of transmission resources that can be used to transmit DCI. The group of transmission resources is referred to as, for example, a transmission resource group 1. In addition, there is a rectangular block numbered c, indicating a transmission resource included in a group of transmission resources that can be used to transmit DCI. For example, this group of transmission resources is referred to as a transmission resource group 2. It can be seen that the transmission resource group 2 includes one transmission resource. The transmission resource group 1 includes two transmission resources, and aggregation levels corresponding to the two transmission resources are the same or different. Other content in FIG. 6 is described later.

Alternatively, the resources of the PDSCH may not be configured by the network device. For example, the resources of the PDSCH may be pre-defined for the UE and the network device through a protocol. Therefore, S51 is an optional step.

S52: The UE determines a time domain position of at least one first transmission resource in the resources of the PDSCH. Alternatively, the UE may determine a frequency domain position of the at least one first transmission resource. However, the time domain position is mainly discussed in embodiments of this application.

A determining manner that may be used by the UE to determine the time domain position of the at least one first transmission resource is as follows: The network device sends signaling to the UE, and the UE receives the signaling from the network device. The signaling may indicate the time domain position of the at least one first transmission resource. In this case, the UE can determine the time domain position of the at least one first transmission resource based on the signaling. The signaling is also reflected in FIG. 5. FIG. 5 further includes S53. S53 is that the network device sends signaling to the UE, and the UE receives signaling from the network device. The signaling may be one piece of signaling or a plurality of pieces of signaling.

For example, the network device sends one piece of signaling to the UE. The signaling is, for example, radio resource control (RRC) signaling, a media access control (MAC) control element (CE), or DCI. The signaling may be used to schedule the resources of the PDSCH, and the signaling may indicate a time domain position of a transmission resource included in the resources of the PDSCH (where the signaling may optionally indicate a frequency domain position of a transmission resource included in the resources of the PDSCH). The UE can determine the time domain position of the at least one first transmission resource through this piece of signaling.

For another example, the network device sends two pieces of signaling to the UE, where one piece of signaling is, for example, RRC signaling, a MAC CE, or DCI, and the signaling may be used to schedule the resources of the PDSCH. The other signaling is, for example, RRC signaling, a MAC CE, or DCI (where the types of the two pieces of signaling may be the same or different). The signaling may indicate a time domain position of a transmission resource included in the resources of the PDSCH (where the signaling may optionally indicate a frequency domain position of a transmission resource included in the resources of the PDSCH). The UE can determine the time domain position of the at least one first transmission resource through the two pieces of signaling.

For another example, the network device sends a plurality of pieces of signaling to the UE, where a quantity of signaling is greater than or equal to 3, one piece of signaling is, for example, RRC signaling, a MAC CE, or DCI, and the signaling may be used to schedule the resources of the PDSCH. Another piece of signaling is, for example, RRC signaling, a MAC CE, or DCI (where the types of the two pieces of signaling may be the same or different). The signaling may indicate time domain positions of a part of transmission resources included in the resources of the PDSCH (where the signaling may optionally indicate frequency domain positions of this part of transmission resources). Still another piece of signaling is, for example, RRC signaling, a MAC CE, or DCI (where the types of the three pieces of signaling may be the same or different). The signaling may indicate time domain positions of another part of transmission resources included in the resources of the PDSCH (where the signaling may optionally indicate frequency domain positions of this part of transmission resources). In other words, the network device may indicate, through two or more pieces of signaling, the time domain positions of the transmission resources included in the resources of the PDSCH. In this case, the UE can determine the time domain position of the at least one first transmission resource through the plurality of pieces of signaling.

Another determining manner that may be used by the UE to determine the time domain position of the at least one first transmission resource is as follows: The network device sends signaling to the UE, and the UE receives the signaling from the network device. The UE can determine the time domain position of the at least one first transmission resource based on the signaling and a protocol definition.

For example, the network device sends one piece of signaling to the UE, where the signaling is, for example, RRC signaling, a MAC CE, or DCI, and the signaling may be used to schedule the resources of the PDSCH. In addition, a time domain position and the like of a transmission resource that is included in the resources of the PDSCH and that can transmit DCI may be pre-defined for the UE and the network device through a protocol. For example, an offset of a start position of a transmission resource that is in the resources of the PDSCH and that can transmit DCI relative to a start position or an end position of the resources of the PDSCH is pre-defined in the protocol for the UE and the network device, and an offset of an end position of the transmission resource that is in the resources of the PDSCH and that can transmit DCI relative to the start position or the end position of the resources of the PDSCH is specified in the protocol. In this case, based on the start position or the end position of the resources of the PDSCH, and the offsets pre-defined in the protocol for the UE and the network device, the UE can determine the time domain position of the transmission resource that is included in the resources of the PDSCH and that can transmit the DCI, so that the time domain position of the at least one first transmission resource can be determined. The start position of the resource herein includes, for example, a start position of the time domain position and/or a start position of the frequency domain position, and the end position of the resource herein includes, for example, an end position of the time domain position and/or an end position of the frequency domain position.

In the foregoing manner, the network device sends signaling to the UE, and the UE may determine the time domain position of the at least one first transmission resource through the signaling. If the network device also sends first DCI to the UE, the first DCI may be used as one piece of signaling in the signaling. For example, the first DCI may be further used to schedule the resources of the PDSCH. This is used as an example in FIG. 6. Alternatively, the first DCI may not be used as one piece of signaling in the signaling. The first DCI is described later.

Alternatively, the UE may determine the time domain position of the at least one first transmission resource in another manner. This is not limited in embodiments of this application.

S54: The UE determines, based on the time domain position of the at least one first transmission resource and time domain positions of the resources of the PDSCH, a condition satisfied by the at least one first transmission resource. In this embodiment of this application, the condition satisfied by the at least one first transmission resource may include a first condition and a second condition. In this case, the UE may determine that the at least one first transmission resource satisfies the first condition or the second condition.

There are different division manners for division of the first condition and the second condition. Correspondingly, if the UE needs to determine the condition satisfied by the at least one first transmission resource, there are different determining manners. The following uses an example for description.

1. First Condition Division Manner

The first condition is that the start position of the time domain position of the at least one first transmission resource is earlier than a first time domain position. The second condition is that the start position of the time domain position of the at least one first transmission resource is the same as or later than the first time domain position. When the start position of the time domain position of the at least one first transmission resource is earlier than the first time domain position, the UE determines that the first transmission resource satisfies the first condition; and when the start position of the time domain position of the at least one first transmission resource is the same as or later than the first time domain position, the UE determines that the first transmission resource satisfies the second condition.

Alternatively, the first condition is that the start position of the time domain position of the at least one first transmission resource is the same as or earlier than the first time domain position; and the second condition is that the start position of the time domain position of the at least one first transmission resource is later than the first time domain position. When the start position of the time domain position of the at least one first transmission resource is the same as or earlier than the first time domain position, the UE determines that the first transmission resource satisfies the first condition; and when the start position of the time domain position of the at least one first transmission resource is later than the first time domain position, the UE determines that the first transmission resource satisfies the second condition.

The first time domain position is a position offset by a first time interval from the start position of the time domain positions of the resources of the PDSCH. The first time interval may include zero, one, or more time domain resource units, where the time domain resource unit is, for example, a slot, an OFDM symbol, or an OFDM symbol corresponding to resources of one repetition of the PDSCH. For example, the first time interval is zero, one, or more slots, or the first time interval is zero, one, or more OFDM symbols, or the first time interval is zero, one, or more OFDM symbols corresponding to resources a repetition of the PDSCH. If the first time interval is 0, the first time domain position is the same as the start position of the time domain positions of the resources of the PDSCH; or if the first time interval is greater than 0, the first time domain position is later than the start position of the time domain positions of the resources of the PDSCH. The first time interval may be configured by the network device. For example, the network device configures the first time interval for the UE through RRC signaling, a MAC CE, DCI, or the like. Alternatively, the first time interval may be pre-defined for the UE and the network device through a protocol.

The transmission resource group 1 in FIG. 6 is used as an example. If the start position of the time domain positions of the resources of the PDSCH is offset rightward to a position after the first time interval and is later than a start position of a time domain position of the transmission resource group 1 (namely, a start position of a time domain position of the rectangular block numbered a or b), the transmission resource group 1 satisfies the first condition. However, if the start position of the time domain positions of the resources of the PDSCH is offset rightward to a position after the first time interval and is earlier than the start position of the time domain position of the transmission resource group 1, the transmission resource group 1 satisfies the second condition.

2. Second Condition Division Manner

As described above, one PDSCH transmission may include a plurality of repetitions. Each repetition may be used to transmit same transport blocks, but RVs of the transport blocks transmitted in different repetitions may be different. A transport block transmitted in a first repetition of the PDSCH in time domain includes system bits. If the UE receives the transport block transmitted in the first repetition, self-decoding can be performed. In this case, in the second condition division manner, the first condition is that the at least one first transmission resource is all located in a resource of the first repetition of the PDSCH in time domain; and the second condition is that the at least one first transmission resource is not all located in the resource of the first repetition of the PDSCH in time domain. In other words, different conditions are divided based on whether self-decoding can be satisfied. The resource of the first repetition of the PDSCH in time domain is a resource used to carry the first repetition of the PDSCH in time domain.

The foregoing describes several manners of determining, by the UE, the condition satisfied by the at least one first transmission resource. In addition, the UE may further determine, in another manner, the condition satisfied by the at least one first transmission resource. A manner used by the UE to determine the condition satisfied by the at least one first transmission resource may be configured by the network device, or may be pre-defined for the UE and the network device through a protocol, or the like.

S55: The UE determines a transmission mode of the DCI and/or the PDSCH in the resources of the PDSCH based on the condition satisfied by the time domain position of the at least one first transmission resource, or the UE determines a transmission mode of DCI in the at least one transmission resource and/or a transmission mode of the PDSCH in the resources of the PDSCH based on the condition satisfied by the time domain position of the at least one first transmission resource. For example, the UE may determine the transmission mode of the DCI in the resources of the PDSCH based on the condition satisfied by the at least one first transmission resource. Alternatively, the UE may determine the transmission mode of the PDSCH in the resources of the PDSCH based on the condition satisfied by the at least one first transmission resource. Alternatively, the UE may determine the transmission modes of the DCI and the PDSCH in the resources of the PDSCH based on the condition satisfied by the at least one first transmission resource. The DCI in the resources of the PDSCH described herein is the DCI in the first transmission resource.

Based on different conditions satisfied by the at least one first transmission resource, transmission modes of the DCI in the resources of the PDSCH are different, and transmission modes of the PDSCH in the resources of the PDSCH are also different. The following describes the transmission modes separately.

1. The at least one first transmission resource satisfies the first condition.

When the at least one first transmission resource satisfies the first condition, the UE may determine the transmission mode of the DCI and/or the PDSCH in the resources of the PDSCH. The following first describes how the UE determines the transmission mode of the DCI in the resources of the PDSCH.

(1) The transmission mode of the DCI in the resources of the PDSCH when the at least one first transmission resource satisfies the first condition The transmission mode of the DCI in the resources of the PDSCH may include a plurality of aspects. For example, one aspect is whether the DCI is transmitted in the resources of the PDSCH. For the at least one first transmission resource, it is to be determined whether the DCI is transmitted in the at least one first transmission resource. Missing detection or false alarm may occur in the DCI to affect performance of the PDSCH. Therefore, to improve performance of the PDSCH, the UE may determine the transmission mode of the DCI in the resources of the PDSCH through one piece of DCI. For example, this embodiment of this application further includes S56 before S55. The network device sends the first DCI to the UE, and correspondingly, the UE receives the first DCI from the network device. S56 is an optional step. In other words, the network device does not necessarily send the first DCI. The first DCI may be carried in a PDCCH, or the first DCI may be carried in the resources of the PDSCH that include the at least one first transmission resource. For example, referring to FIG. 6, the first DCI in FIG. 6 is carried in the PDCCH. In FIG. 6, a start position of a time domain position of the first DCI is earlier than or the same as the start position of the time domain positions of the PDSCH.

When the at least one first transmission resource satisfies the first condition, the first DCI may indicate that the at least one first transmission resource transmits the DCI, or indicate that the at least one first transmission resource does not transmit the DCI. For example, the first DCI includes the first indication information, and the first indication information is carried through a first indication field. The first indication field may be an original field included in the first DCI, or may be a field newly added to the first DCI in this embodiment of this application. For example, when the at least one first transmission resource satisfies the first condition, the first indication information indicates that the at least one first transmission resource transmits the DCI, or indicates that the at least one first transmission resource does not transmit the DCI. In other words, if the at least one first transmission resource satisfies the first condition, it indicates that a distance between the time domain position of the at least one first transmission resource and the time domain position of the first DCI is short. For example, it indicates that the distance between the time domain position of the at least one first transmission resource and the time domain position of the first DCI is less than a first threshold. In this case, when sending the first DCI, the network device should be able to determine whether to send the DCI in the at least one first transmission resource. Therefore, the first indication information can provide a clear indication, to reduce a blind detection process of the UE. The first threshold may be configured by the network device, or may be pre-defined for the UE and the network device through a protocol, or the like. If the resources of the PDSCH include other transmission resources in addition to the at least one first transmission resource, whether DCI is transmitted in such transmission resources may be indicated through the first DCI. In this case, the first DCI may include a plurality of pieces of indication information, the indication information is in a one-to-one correspondence with transmission resource groups, and one piece of indication information indicates whether the corresponding transmission resource groups transmit the DCI. The at least one first transmission resource is used as an example herein. Therefore, the first indication information included in the first DCI is used as an example. An implementation of another transmission resource group is similar.

It should be noted that, if a quantity of the at least one first transmission resource is greater than 1, even if the first indication information indicates that the at least one first transmission resource transmits the DCI, the first indication information does not clearly indicate which first transmission resource of the at least one first transmission resource transmits the DCI. Therefore, the UE still needs to blindly detect DCI in each first transmission resource of the at least one first transmission resource. However, if the quantity of the at least one first transmission resource is 1, it indicates that the UE determines a specific position of the DCI, and the UE may not need to perform blind detection, but receive the DCI in the first transmission resource. Certainly, if the first indication information indicates that the at least one first transmission resource does not transmit the DCI, the UE does not need to monitor the DCI in the at least one first transmission resource. It can be learned that, through the first indication information, a quantity of times of blind detection performed by the UE is reduced, and power consumption of the UE is reduced.

The transmission mode of the DCI in the resources of the PDSCH may include a plurality of aspects. For example, another aspect is a quantity of CRC bits of the DCI.

For example, when the at least one first transmission resource satisfies the first condition and the network device indicates that the at least one first transmission resource transmits the DCI, the quantity of CRC bits of the DCI transmitted in the at least one first transmission resource is a first quantity of bits. The network device indicates that the at least one first transmission resource transmits the DCI. For example, in an indication manner, the network device sends first signaling to the terminal device, where the first signaling includes second indication information, and the second indication information may indicate that the at least one first transmission resource transmits the DCI or does not transmit the DCI. In this case, the network device may indicate, through the second indication information, that the at least one first transmission resource transmits the DCI. Alternatively, the network device indicates that the at least one first transmission resource transmits the DCI. For example, in another indication manner, the network device sends first signaling to the terminal device, where the first signaling does not include second indication information, and the first signaling may indicate, through the behavior (or the event) of not including the second indication information, that the at least one first transmission resource transmits the DCI or does not transmit the DCI. The first signaling is, for example, the foregoing first DCI, or may be higher layer signaling. The higher layer signaling is, for example, RRC signaling or a MAC CE. If the first signaling is higher layer signaling, before S55, the network device may send the higher layer signaling to the UE, and correspondingly, the UE receives the higher layer signaling from the network device. If the first signaling is higher layer signaling, the network device may send the first DCI to the UE, or may not send the first DCI. If the first signaling is the first DCI, the second indication information and the first indication information may be the same indication information.

Alternatively, when the at least one first transmission resource satisfies the first condition, the quantity of CRC bits of the DCI transmitted in the at least one first transmission resource is the first quantity of bits. In this manner, as long as the at least one first transmission resource satisfies the first condition, the UE determines that the quantity of CRC bits of the DCI transmitted in the at least one first transmission resource is the first quantity of bits. In other words, the UE does not need to determine another condition. The implementation for the UE is simple.

For another example, when the at least one first transmission resource satisfies the first condition, and the network device indicates that the at least one first transmission resource may transmit the DCI (or the network device indicates that the DCI is monitored on the at least one first transmission resource), the quantity of CRC bits of the DCI transmitted in the at least one first transmission resource is a second quantity of bits. The network device indicates that the DCI is monitored on the at least one first transmission resource. For example, in an indication manner, the network device sends first signaling to the terminal device, where the first signaling includes third indication information. The third indication information may indicate that the at least one first transmission resource transmits the DCI, or indicate that the at least one first transmission resource does not transmit the DCI, or indicate that the DCI is monitored on the at least one first transmission resource. In this case, the network device may indicate, through the third indication information, that the DCI is monitored on the at least one first transmission resource. Alternatively, the network device indicates that the DCI is monitored on the at least one first transmission resource. For example, in another indication manner, the network device sends first signaling to the terminal device, where the first signaling does not include third indication information, and the first signaling may indicate, through the behavior (or the event) of not including the third indication information, that the at least one first transmission resource transmits the DCI, or the at least one first transmission resource does not transmit the DCI, or the DCI is monitored on the at least one first transmission resource. The first signaling is, for example, the foregoing first DCI, or may be higher layer signaling. The higher layer signaling is, for example, RRC signaling or a MAC CE. If the first signaling is higher layer signaling, before S55, the network device may send the higher layer signaling to the UE, and correspondingly, the UE receives the higher layer signaling from the network device. The third indication information and the foregoing second indication information may be the same indication information, and the second indication information may further indicate that the DCI is monitored on the at least one first transmission resource. Alternatively, the third indication information and the second indication information are different indication information. If the first signaling is higher layer signaling, the network device may send the first DCI to the UE, or may not send the first DCI. If the first signaling is the first DCI, the third indication information and the first indication information may be the same indication information, or may be different indication information.

If it is determined that a group of transmission resources is to transmit the DCI, the quantity of CRC bits may be smaller. If it is not determined whether a group of transmission resources is to transmit the DCI, the quantity of CRC bits needs to be larger, to reduce a probability of error in monitoring the DCI. Therefore, optionally, the first quantity of bits may be less than the second quantity of bits. For example, the first quantity of bits and the second quantity of bits may be configured by the network device, or may be pre-defined for the UE and the network device through a protocol.

Certainly, if the first signaling indicates that the first transmission resource does not transmit the DCI, there is no concept of a quantity of CRC bits in the at least one first transmission resource.

The foregoing describes how the UE determines the transmission mode of the DCI in the resources of the PDSCH, and the following describes how the UE determines the transmission mode of the PDSCH in the resources of the PDSCH.

(2) The transmission mode of the PDSCH in the resources of the PDSCH when the at least one first transmission resource satisfies the first condition The transmission mode of the PDSCH in the resources of the PDSCH may include a plurality of aspects. For example, one aspect is a mapping manner used by the resources of the PDSCH for a first transmission resource that is in the at least one first transmission resource and that transmits the DCI.

For example, when the at least one first transmission resource satisfies the first condition, and the network device indicates that the at least one first transmission resource transmits the DCI, the mapping manner used by the resources of the PDSCH for the first transmission resource that is in the at least one first transmission resource and that transmits the DCI is a rate matching manner. For content such as how the network device indicates, refer to the foregoing description. If it is determined that a group of transmission resources is to transmit the DCI, performance of rate matching is better than that of puncturing. Therefore, if it is determined that the at least one first transmission resource transmits the DCI, the mapping manner used by the resources of the PDSCH for the first transmission resource that is in the at least one first transmission resource and that transmits the DCI may be the rate matching manner. If the quantity of the at least one first transmission resource is 1, or in other words, the at least one first transmission resource is one first transmission resource, the first transmission resource that is in the at least one first transmission resource and that transmits the DCI is the first transmission resource. Alternatively, if the quantity of the at least one first transmission resource is greater than 1, the DCI is transmitted on some first transmission resources of the plurality of first transmission resources, and the first transmission resource that is in the at least one first transmission resource and that transmits the DCI is a first transmission resource that is in the plurality of first transmission resources and that transmits the DCI. For example, one first transmission resource in the at least one first transmission resource may be used to transmit the DCI, and the remaining first transmission resources do not transmit the DCI.

For another example, when the at least one first transmission resource satisfies the first condition, the mapping manner used by the resources of the PDSCH for the first transmission resource that is in the at least one first transmission resource and that transmits the DCI is the rate matching manner. In this manner, as long as the at least one first transmission resource satisfies the first condition, the UE determines that the mapping manner used by the resources of the PDSCH for the first transmission resource that is in the at least one first transmission resource and that transmits the DCI is the rate matching manner. In other words, the UE does not need to determine another condition. The implementation for the UE is simple.

Another aspect of the transmission mode of the PDSCH in the resources of the PDSCH is, for example, an RV used for a repetition of the PDSCH in resources of a downlink data channel.

For example, when the at least one first transmission resource satisfies the first condition and the network device indicates that the at least one first transmission resource transmits the DCI, both RVs of the first repetition and a second repetition of the PDSCH in time domain are first versions. As described above, the network device may configure an RV for the PDSCH, and the first version is, for example, a first RV configured by the network device for the PDSCH. For example, if the RV configured by the network device for the PDSCH through higher layer signaling is {0, 2, 3, 1}, RV0 is the first RV configured by the network device for the PDSCH, RV2 is a second RV configured by the network device for the PDSCH, RV3 is a third RV configured by the network device for the PDSCH, and RV1 is a fourth RV configured by the network device for the PDSCH. For example, the first condition and the second condition are classified based on the second condition division manner described above. In other words, when the at least one first transmission resource is all located in the resource of the first repetition of the PDSCH in time domain, the at least one first transmission resource satisfies the first condition. Conversely, when the at least one first transmission resource satisfies the first condition, the at least one first transmission resource is all located in the resource of the first repetition of the PDSCH in time domain. In this case, the at least one first transmission resource transmits the DCI, and the DCI occupies specific bits. As a result, complete system bits may not be transmitted in the first repetition. In this case, if the UE receives a transport block that does not include the complete system bits, self-decoding may not be performed, and original information cannot be obtained.

Therefore, in this embodiment of this application, the RVs of the first repetition and the second repetition of the PDSCH in time domain may be the first version. For example, the first version is RV0, or may be another version. For example, a transport block transmitted by using the first version may include the system bits. In this case, even if the first repetition of the PDSCH in time domain cannot include the complete system bits due to transmission of the DCI, because the RV of the second repetition of the PDSCH in time domain is also the first version, the second repetition of the PDSCH in time domain may include the complete system bits. In this case, the UE can also perform self-decoding based on the transport block transmitted in the second repetition of the PDSCH in time domain, to obtain original information, so that a probability of correct decoding by the UE is increased. Certainly, to be more reliable, RVs of more repetitions of the PDSCH in time domain may be the first version, for example, an RV of a third repetition of the PDSCH in time domain may be the first version. In addition to the repetition using the first version, other repetitions of the PDSCH in time domain may use other versions, for example, the RVs of the first repetition and the second repetition of the PDSCH in time domain are the first version, the RV of the third repetition of the PDSCH in time domain may be the second RV configured by the network device for the PDSCH, the RV of the fourth repetition of the PDSCH may be the third RV configured by the network device for the PDSCH, and so on. Types of the second RV, the third RV, and the like are not limited in embodiments of this application.

The foregoing describes the case in which the at least one first transmission resource satisfies the first condition, and the following describes a case in which the at least one first transmission resource satisfies the second condition.

2. The at least one first transmission resource satisfies the second condition.

(1) The transmission mode of the DCI in the resources of the PDSCH when the at least one first transmission resource satisfies the second condition The transmission mode of the DCI in the resources of the PDSCH may include a plurality of aspects. For example, one aspect is whether the DCI is transmitted in the resources of the PDSCH. Similarly, the UE may perform determining through the first DCI. For the description of the first DCI, refer to the foregoing description.

When the at least one first transmission resource satisfies the second condition, the first DCI indicates that the at least one first transmission resource transmits the DCI, or indicates that the DCI is monitored on the at least one first transmission resource. For example, the first DCI may include first indication information. For the description of the first indication information, refer to the foregoing description. For example, when the at least one first transmission resource satisfies the second condition, the first indication information may indicate that the at least one first transmission resource transmits the DCI, or indicate that the DCI is monitored on the at least one first transmission resource. If it is indicated that the DCI is monitored on the at least one first transmission resource, it indicates that the DCI may be transmitted, or the DCI may not be transmitted. This needs to be determined by the UE by performing blind detection. For example, if the first transmission resource satisfies the second condition, it indicates that a distance between the time domain position of the at least one first transmission resource and the time domain position of the first DCI is long. When the network device sends the first DCI (for example, at a moment t0 in FIG. 6), it may be clear whether the DCI is sent in the at least one first transmission resource, or it may not be clear whether the DCI is sent in the at least one first transmission resource (for example, the network device may need to wait until a moment t1 in FIG. 6 to determine whether the DCI is sent in the at least one first transmission resource). Therefore, when it is not clear, the first DCI may indicate that the DCI is monitored on the at least one first transmission resource instead of indicating that the at least one first transmission resource does not transmit the DCI. In this indication manner, different generation times of the DCI are considered, and a probability of errors in CRC detection performed by the UE is reduced.

Alternatively, when the at least one first transmission resource satisfies the second condition, the first DCI may not include the first indication information. The first indication information may indicate that the at least one first transmission resource transmits the DCI, or indicate that the DCI is monitored on the at least one first transmission resource, or indicate that the at least one first transmission resource does not transmit the DCI. In this case, the first DCI does not include the first indication information. It indicates that the first DCI does not indicate that the at least one first transmission resource transmits the downlink control information, does not indicate that the at least one first transmission resource does not transmit the downlink control information, and does not indicate that the downlink control information is monitored on the at least one first transmission resource. In other words, the first DCI does not indicate whether the at least one first transmission resource transmits the DCI. For example, when sending the first DCI, the network device may not be able to determine whether the DCI is sent in the at least one first transmission resource. Therefore, the first DCI does not indicate whether the at least one first transmission resource transmits the DCI. For the UE, if the first DCI does not indicate whether the at least one first transmission resource transmits the DCI, or if the first DCI does not include the first indication information, the UE needs to perform blind detection on the at least one first transmission resource.

If the first DCI indicates that the at least one first transmission resource transmits the DCI, for whether the UE should blindly detect the DCI, refer to the foregoing description. If the first DCI indicates that the DCI is monitored on the at least one first transmission resource, the UE needs to blindly detect the DCI in the at least one first transmission resource, to reduce a probability of missing detection of DCI by the UE. If the first DCI indicates that the at least one first transmission resource does not transmit the DCI, the UE does not need to blindly detect the DCI in the at least one first transmission resource.

The transmission mode of the DCI in the resources of the PDSCH may include a plurality of aspects. For example, another aspect is a quantity of CRC bits of the DCI.

For example, when the at least one first transmission resource satisfies the second condition, the quantity of CRC bits of the DCI transmitted in the at least one first transmission resource is the second quantity of bits. In this case, the UE does not need to perform determining through other information. As long as the at least one first transmission resource satisfies the second condition, it can be determined that the quantity of CRC bits of the DCI transmitted in the at least one first transmission resource is the second quantity of bits. In this manner, no excessive information is required, and therefore, the determination manner is simple.

Alternatively, when the at least one first transmission resource satisfies the second condition and the network device indicates that the at least one first transmission resource transmits the DCI, the quantity of CRC bits of the DCI transmitted in the at least one first transmission resource is the first quantity of bits. Alternatively, when the at least one first transmission resource satisfies the second condition and the network device indicates that the at least one first transmission resource may transmit the DCI, the quantity of CRC bits of the DCI transmitted in the at least one first transmission resource is the second quantity of bits. For content such as how the network device indicates, refer to the foregoing description. The quantity of CRC bits of the DCI is determined through more information, so that a determining result can be more accurate.

If it is determined that a group of transmission resources transmits the DCI, the quantity of CRC bits may be smaller. If it is not determined whether a group of transmission resources transmits the DCI, the quantity of CRC bits needs to be larger, to reduce a probability of error in monitoring the DCI. Therefore, optionally, the first quantity of bits may be less than the second quantity of bits. For more description of the first quantity of bits and the second quantity of bits, refer to the foregoing description.

The foregoing describes how the UE determines the transmission mode of the DCI in the resources of the PDSCH, and the following describes how the UE determines the transmission mode of the PDSCH in the resources of the PDSCH.

(2) The transmission mode of the PDSCH in the resources of the PDSCH when the at least one first transmission resource satisfies the second condition The transmission mode of the PDSCH in the resources of the PDSCH may include a plurality of aspects. For example, one aspect is a mapping manner used by the resources of the PDSCH for a first transmission resource that is in the at least one first transmission resource and that transmits the DCI. For understand of the resources of the PDSCH for the first transmission resource that is in the at least one first transmission resource and that transmits the DCI, refer to the foregoing related description.

For example, when the at least one first transmission resource satisfies the second condition, the mapping manner used by the resources of the PDSCH for the first transmission resource that is in the at least one first transmission resource and that transmits the DCI is a puncturing manner. For content such as how the network device indicates, refer to the foregoing description. In this case, the UE does not need to perform determining through other information. As long as the at least one first transmission resource satisfies the second condition, the UE may determine that the mapping manner used by the resources of the PDSCH for the first transmission resource that is in the at least one first transmission resource and that transmits the DCI is the puncturing manner. In this manner, no excessive information is required, and therefore, the determination manner is simple. In addition, in this case, the UE cannot determine whether the at least one first transmission resource transmits the DCI, but needs to perform blind detection on the PDCCH to determine whether the at least one first transmission resource transmits the DCI. Therefore, it can be learned from the foregoing description that performance of puncturing is better than that of rate matching.

Alternatively, when the at least one first transmission resource satisfies the second condition, and the network device indicates that the at least one first transmission resource transmits the DCI, the mapping manner used by the resources of the PDSCH for the first transmission resource that is in the at least one first transmission resource and that transmits the DCI is the rate matching manner. Alternatively, when the at least one first transmission resource satisfies the second condition, and the network device indicates that the DCI is monitored on the at least one first transmission resource, the mapping manner used by the resources of the PDSCH for the first transmission resource that is in the at least one first transmission resource and that transmits the DCI is the puncturing manner. If it is determined that a group of transmission resources is to transmit the DCI, performance of rate matching is better than that of puncturing. Therefore, if it is determined that the at least one first transmission resource transmits the DCI, the mapping manner used by the resources of the PDSCH for the first transmission resource that is in the at least one first transmission resource and that transmits the DCI may be the rate matching manner. However, if it is not determined whether the at least one first transmission resource transmits the DCI, for example, whether the at least one first transmission resource transmits the DCI is determined only through blind detection is performed, the puncturing manner can ensure as much as possible that mapping of resources that are used to transmit the PDSCH and that are in the resources of the PDSCH is correct whether a result of the blind detection is correct or not. Therefore, when an error may occur during the blind detection, performance of puncturing is better than that of rate matching. Therefore, if the network device indicates that the DCI is monitored on the at least one first transmission resource, the mapping manner used by the resources of the PDSCH for the first transmission resource that is in the at least one first transmission resource and that transmits the DCI is the puncturing manner. For content such as how the network device indicates, refer to the foregoing description.

Another aspect of the transmission mode of the PDSCH in the resources of the PDSCH is, for example, an RV used for a repetition of the PDSCH in the resources of the PDSCH.

For example, when the at least one first transmission resource satisfies the second condition and the network device indicates that the at least one first transmission resource transmits the DCI, the RV of the first repetition of the PDSCH in time domain is the first version, and the RV of the second repetition of the PDSCH in time domain is a second version. For example, the first condition and the second condition are classified based on the second condition division manner described above. In other words, when the at least one first transmission resource is not all located in the resource of the first repetition of the PDSCH in time domain, the at least one first transmission resource satisfies the second condition. Conversely, when the at least one first transmission resource satisfies the second condition, the at least one first transmission resource is not all located in the resource of the first repetition of the PDSCH in time domain. In this case, even if the at least one first transmission resource transmits the DCI, the first repetition of the PDSCH in time domain may not be affected. In other words, the first repetition of the PDSCH in time domain may still include complete information bits. Therefore, in this case, the RV of the first repetition of the PDSCH in time domain may be the first version. For example, the first version is RV0, or may be another version. For example, a transport block transmitted by using the first version may include the system bits. However, other repetitions of the PDSCH in time domain may not all use the first version. For example, the second repetition of the PDSCH in time domain may use the second RV configured by the network device for the PDSCH, and the third repetition of the PDSCH in time domain may use the third RV configured by the network device for the PDSCH. For descriptions of content such as the first version and the RV configured by the network device for the PDSCH, refer to the foregoing description.

The network device may also determine the transmission mode of the DCI and/or the PDSCH in the resources of the PDSCH based on the condition satisfied by the at least one first transmission resource. A determining manner of the network device is consistent with a determining manner of the UE, and details are not described again.

In this embodiment of this application, the network device may send the first DCI, to indicate whether the DCI is transmitted in the at least one first transmission resource. In this case, the UE may determine, based on the time domain position of the at least one first transmission resource, the condition satisfied by the at least one first transmission resource, and further determine content indicated by the first DCI. In this way, a probability of errors in CRC detection by the UE can be reduced. In addition, the first DCI may further indicate that the DCI is monitored and transmitted on the at least one first transmission resource, in other words, may indicate an uncertain case. In this case, different generation times of the DCI are considered.

According to this embodiment of this application, the quantity of CRC bits of the DCI monitored in the at least one first transmission resource can be determined based on the condition satisfied by the at least one first transmission resource. If the UE determines that the at least one first transmission resource transmits the DCI, the determined quantity of CRC bits may be small, thereby reducing CRC overheads.

In addition, in this embodiment of this application, impact of transmission of the DCI on the mapping manner of the PDSCH can be determined based on the condition satisfied by the at least one first transmission resource, to improve transmission performance of the PDSCH.

In addition, in this embodiment of this application, the RV of the repetition of the PDSCH can be further determined based on the condition satisfied by the at least one first transmission resource, to improve performance of the PDSCH.

Figure 7:
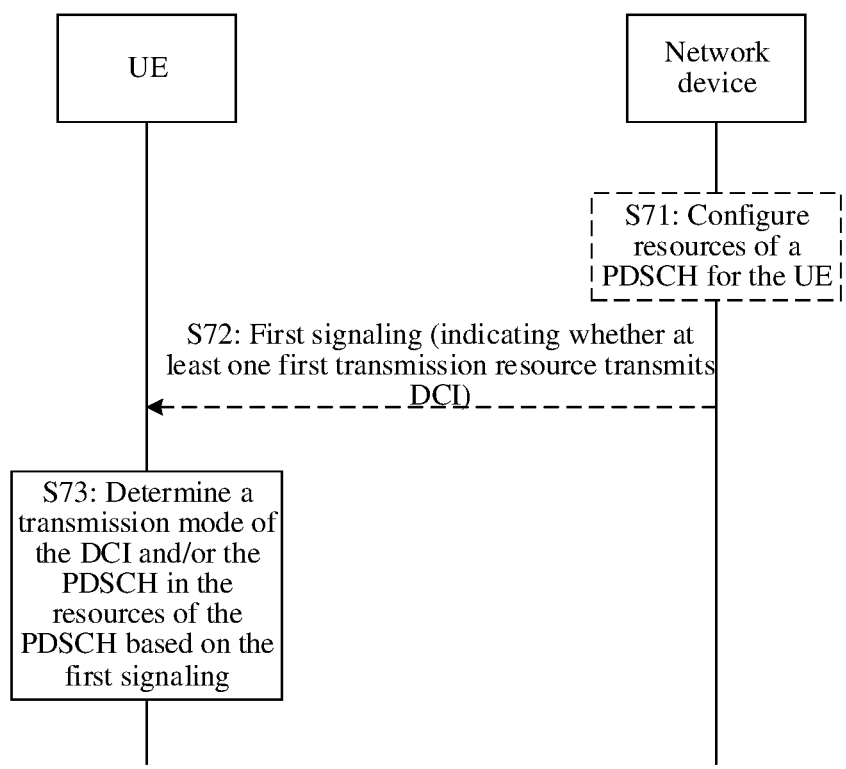
FIG. 7 is a flowchart of another downlink transmission method according to an embodiment of this application.

FIG. 7 shows another downlink transmission method according to an embodiment of this application. In this method, the UE can determine a transmission mode of DCI and/or a PDSCH in resources of a PDSCH without determining a condition satisfied by transmission resources.

S71: A network device configures resources of a PDSCH for UE.

For example, the resources of the PDSCH include one or more groups of transmission resources. The one or more groups of transmission resources can be used to transmit DCI. In other words, the one or more groups of transmission resources are candidate resources for transmitting DCI. For example, the one or more groups of transmission resources include one group of transmission resources, and the group of transmission resources includes at least one first transmission resource. Start positions of time domain positions of different first transmission resources in the at least one first transmission resource are the same, end positions of the time domain positions of the different first transmission resources may be the same or may be different, but sizes of time-frequency resources of different first transmission resources are different.

For more content of S71, refer to S51 in the embodiment shown in FIG. 5. Similarly, S71 is also an optional step.

S72: The network device sends first signaling, and correspondingly, the UE receives the first signaling from the network device. The first signaling is, for example, RRC signaling, a MAC CE, or DCI.

For example, the first signaling may indicate that the at least one first transmission resource transmits the DCI, or the first signaling may indicate that the at least one first transmission resource does not transmit the DCI, or the first signaling may indicate that the DCI is monitored on the at least one first transmission resource. For example, if a distance between a time domain position at which the network device sends first DCI and the time domain position of the at least one first transmission resource is short, the network device can already determine whether the at least one first transmission resource transmits the DCI when sending the first DCI. In this case, the first signaling may indicate that the at least one first transmission resource transmits the DCI or does not transmit the DCI. However, if the distance between the time domain position at which the network device sends the first DCI and the time domain position of the at least one first transmission resource is short, the network device cannot determine whether the DCI is to be transmitted in the at least one first transmission resource when sending the first DCI. In this case, the first signaling may indicate that the DCI is monitored on the at least one first transmission resource.

The first signaling indicates whether the at least one first transmission resource transmits the DCI. In an implementation, the first signaling includes first indication information, and the first indication information indicates whether the at least one first transmission resource transmits the DCI. The first indication information is carried through a first indication field. The first indication field may be an original field included in the first signaling, or may be a field newly added to the first signaling in this embodiment of this application. The first indication information may indicate that the at least one first transmission resource transmits the DCI, or indicate that the at least one first transmission resource does not transmit the DCI, or indicate that the DCI is monitored on the at least one first transmission resource. If the resources of the PDSCH include other transmission resources in addition to the at least one first transmission resource, whether DCI is transmitted in such transmission resources may be indicated through the first signaling. In this case, the first signaling may include a plurality of pieces of indication information, the indication information is in a one-to-one correspondence with transmission resource groups, and one piece of indication information indicates whether the corresponding transmission resource groups transmit the DCI. The at least one first transmission resource is used as an example herein. Therefore, the first indication information included in the first signaling is used as an example. An implementation of another transmission resource group is similar.

Alternatively, the first signaling indicates whether the at least one first transmission resource transmits the DCI. In another implementation, the first signaling does not include the first indication information, and the behavior (or the event) of not including the first indication information in the first signaling indicates whether the at least one first transmission resource transmits the DCI. The first signaling does not include the first indication information, and may indicate that the at least one first transmission resource transmits the DCI, or indicate that the at least one first transmission resource does not transmit the DCI, or indicate that the DCI is monitored on the at least one first transmission resource. If the resources of the PDSCH include other transmission resources in addition to the at least one first transmission resource, whether DCI is transmitted in such transmission resources may be indicated through the first signaling. In this case, the first signaling may indicate, in a manner of not including indication information, whether a corresponding transmission resource group transmits the DCI, where the indication information is in a one-to-one correspondence with the transmission resource group. The at least one first transmission resource is used as an example herein. Therefore, the first signaling not including the first indication information is used as an example. An implementation of another transmission resource group is similar.

S73: The UE determines a transmission mode of the DCI and/or the PDSCH in the resources of the PDSCH based on the first signaling. For example, the UE may determine the transmission mode of the DCI in the resources of the PDSCH based on the first signaling. Alternatively, the UE may determine the transmission mode of the PDSCH in the resources of the PDSCH based on the first signaling. Alternatively, the UE may determine the transmission modes of the DCI and the PDSCH in the resources of the PDSCH based on the first signaling. The DCI in the resources of the PDSCH described herein is the DCI in the at least one first transmission resource.

The UE determines the transmission mode of the DCI in the resources of the PDSCH based on the first signaling, and the UE determines the transmission mode of the PDSCH in the resources of the PDSCH based on the first signaling. The two processes are separately described below.

1. The UE determines the transmission mode of the DCI in the resources of the PDSCH based on the first signaling.

The transmission mode of the DCI in the resources of the PDSCH may include a plurality of aspects. For example, one aspect is whether the DCI is transmitted in the resources of the PDSCH. However, for this aspect, the first signaling has an indication. Therefore, the UE can determine, based on the first signaling, whether the at least one first transmission resource transmits the DCI. For example, if the first signaling indicates that the at least one first transmission resource transmits the DCI, the UE determines that the first transmission resource transmits the DCI. Alternatively, if the first signaling indicates that the at least one first transmission resource does not transmit the DCI, the UE determines that the first transmission resource does not transmit the DCI. Alternatively, if the first signaling indicates that the DCI is monitored on the at least one first transmission resource, the UE determines that the first transmission resource may transmit the DCI. For behaviors such as whether the UE performs blind detection in the foregoing several cases, refer to the description of the embodiment shown in FIG. 5.

Another aspect of the transmission mode of the DCI in the resources of the PDSCH is, for example, a quantity of CRC bits of the DCI transmitted in the resources of the PDSCH.

For example, when the first signaling indicates that the at least one first transmission resource transmits the DCI, the quantity of CRC bits of the DCI transmitted in the at least one first transmission resource is a first quantity of bits. Alternatively, when the first signaling indicates that the DCI is monitored on the at least one first transmission resource, the quantity of CRC bits of the DCI transmitted on the at least one first transmission resource is a second quantity of bits. Certainly, if the first signaling indicates that the at least one first transmission resource does not transmit the DCI, there is no quantity of CRC bits in the at least one first transmission resource. In this case, the PDSCH may be normally sent on the resources of the PDSCH. If it is determined that a group of transmission resources transmits the DCI, the quantity of CRC bits may be smaller. If it is not determined whether a group of transmission resources transmits the DCI, the quantity of CRC bits needs to be larger, to reduce a probability of error in monitoring the DCI. Therefore, optionally, the first quantity of bits may be less than the second quantity of bits. The first quantity of bits and the second quantity of bits may be configured by the network device, or may be pre-defined for the UE and the network device through a protocol.

2. The UE determines the transmission mode of the PDSCH in the resources of the PDSCH based on the first signaling.

The transmission mode of the PDSCH in the resources of the PDSCH may include a plurality of aspects. For example, one aspect is a mapping manner used by the resources of the PDSCH for a first transmission resource that is in the at least one first transmission resource and that transmits the DCI. For understand of the resources of the PDSCH for the first transmission resource that is in the at least one first transmission resource and that transmits the DCI, refer to the related description in the embodiment shown in FIG. 5.

For example, when the first signaling indicates that the at least one first transmission resource transmits the DCI, the mapping manner used by the resources of the PDSCH for the first transmission resource that is in the at least one first transmission resource and that transmits the DCI is the rate matching manner. Alternatively, when the first signaling indicates that DCI is monitored on the at least one first transmission resource, and the DCI is detected on the at least one first transmission resource, the mapping manner used by the resources of the PDSCH for the resource that is in the at least one first transmission resource and that transmits the DCI is the puncturing manner.

If it is determined that a group of transmission resources is to transmit the DCI, performance of rate matching is better than that of puncturing. Therefore, if it is determined that the at least one first transmission resource transmits the DCI, the mapping manner used by the resources of the PDSCH for the first transmission resource that is in the at least one first transmission resource and that transmits the DCI may be the rate matching manner. However, if it is not determined whether the at least one first transmission resource transmits the DCI, for example, whether the at least one first transmission resource transmits the DCI is determined only through blind detection is performed, the puncturing manner can ensure as much as possible that mapping of resources that are used to transmit the PDSCH and that are in the resources of the PDSCH is correct whether a result of the blind detection is correct or not. Therefore, when an error may occur during the blind detection, performance of puncturing is better than that of rate matching. Therefore, if the first signaling indicates that the DCI is monitored on the at least one first transmission resource, the mapping manner used by the resources of the PDSCH for the first transmission resource that is in the at least one first transmission resource and that transmits the DCI is the puncturing manner.

Another aspect of the transmission mode of the PDSCH in the resources of the PDSCH is, for example, an RV used for a repetition of the PDSCH in the resources of the PDSCH.

For example, when the first signaling indicates that the at least one first transmission resource transmits the DCI, both RVs of a first repetition and a second repetition of the PDSCH in time domain are first versions. Alternatively, when the first signaling indicates that the DCI is monitored on the at least one first transmission resource, the RV of the first repetition of the PDSCH in time domain is the first version, and the RV of the second repetition in time domain is a second RV configured by the network device for the PDSCH. Alternatively, when the first signaling indicates that the at least one first transmission resource does not transmit the DCI, the RV of the first repetition of the PDSCH in time domain is the first version, and the RV of the second repetition in time domain is the second RV configured by the network device for the PDSCH. For descriptions of content such as the first version and the RV configured by the network device for the PDSCH, refer to the embodiment shown in FIG. 5.

If the at least one first transmission resource transmits the DCI, and the at least one first transmission resource is located in a resource of the first repetition of the PDSCH in time domain, because the at least one first transmission resource transmits the DCI, the DCI occupies specific bits. As a result, complete system bits may not be transmitted in the first repetition of the PDSCH in time domain. In this case, if the UE receives a transport block that does not include the complete system bits, self-decoding may not be performed, and original information cannot be obtained. Therefore, in this case, the RVs of the first repetition and the second repetition of the PDSCH in time domain may be the first version. For example, the first version is RV0, or may be another version. For example, a transport block transmitted by using the first version may include the system bits. In this case, even if the first repetition of the PDSCH in time domain cannot include the complete system bits due to transmission of the DCI, because the RV of the second repetition of the PDSCH in time domain is also the first version, the second repetition of the PDSCH in time domain may include the complete system bits. In this case, the UE can also perform self-decoding based on the transport block transmitted in the second repetition of the PDSCH in time domain, to obtain original information, so that a probability of correct decoding by the UE is increased. Certainly, to be more reliable, RVs of more repetitions of the PDSCH in time domain may be the first version, for example, an RV of a third repetition of the PDSCH in time domain may be the first version. In addition to the repetition using the first version, other repetitions of the PDSCH may use other versions, for example, the RVs of the first repetition and the second repetition of the PDSCH in time domain are the first version, the RV of the third repetition of the PDSCH in time domain may be the second RV configured by the network device for the PDSCH, the RV of the fourth repetition of the PDSCH in time domain may be the third RV configured by the network device for the PDSCH, and so on.

If the at least one first transmission resource may transmit the DCI (for example, the first signaling indicates that the DCI is monitored on the at least one first transmission resource), or the at least one first transmission resource does not transmit the DCI, there is a high probability that the first repetition of the PDSCH in time domain can include complete system bits. Therefore, in this case, the RV of the first repetition of the PDSCH in time domain may be the first version. For example, the first version is RV0, or may be another version. For example, a transport block transmitted by using the first version may include the system bits. However, other repetitions of the PDSCH in time domain may not all use the first version. For example, the second repetition of the PDSCH in time domain may use the second RV configured by the network device for the PDSCH, and the third repetition of the PDSCH in time domain may use the third RV configured by the network device for the PDSCH. In this way, the technical solutions in embodiments of this application can be better compatible with a current technology.

The network device may also determine the transmission mode of the DCI and/or the PDSCH in the resources of the PDSCH. For example, the network device first determines the transmission mode of the DCI and/or the PDSCH in the resources of the PDSCH, and then indicates the transmission mode of the DCI and/or the PDSCH in the resources of the PDSCH through the first signaling. Therefore, the transmission mode determined by the network device is consistent with the transmission mode determined by the UE (namely, the transmission mode indicated by the first signaling). Details are not described again.

In this embodiment of this application, the network device may send the first signaling, to indicate whether the at least one first transmission resource transmits the DCI. In this case, the UE may determine, based on the first signaling, whether the at least one first transmission resource transmits the DCI, so that a probability of errors in CRC detection by the UE can be reduced. In addition, the first DCI may further indicate that the DCI is monitored on the at least one first transmission resource, in other words, may indicate such an uncertain case. In this case, different generation times of the DCI are considered.

According to this embodiment of this application, the quantity of CRC bits of the DCI monitored in the at least one first transmission resource can be determined based on the first signaling. If the UE determines that the at least one first transmission resource transmits the DCI, the determined quantity of CRC bits may be small, thereby reducing CRC overheads.

In addition, in this embodiment of this application, impact of transmission of the DCI on the mapping manner of the PDSCH can be determined based on the first signaling, to improve transmission performance of the PDSCH.

In addition, in this embodiment of this application, the RV of the repetition of the PDSCH can be further determined based on the first signaling, to improve performance of the PDSCH.

In this embodiment of this application, the transmission mode of the DCI and/or the PDSCH can be determined based only on the first signaling, and a determining process is simple.

Figure 8:
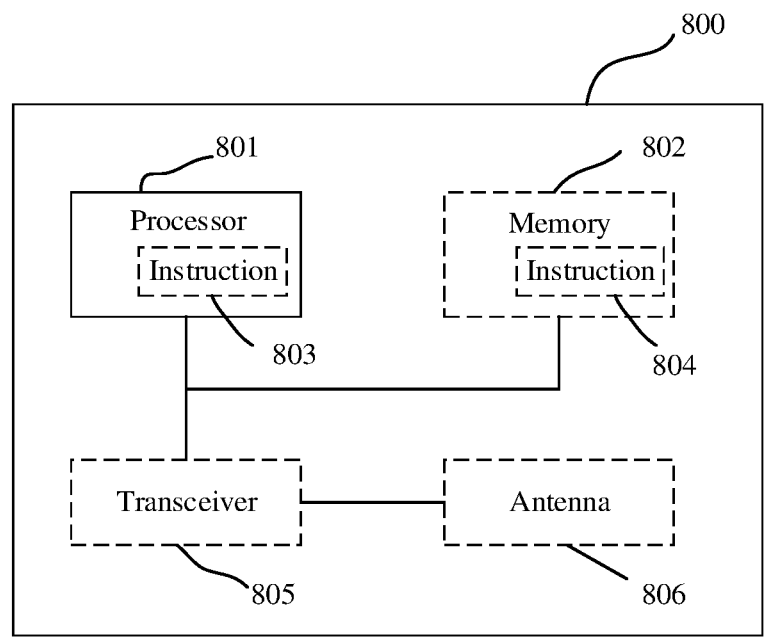
FIG. 8 is a schematic block diagram of a communication apparatus according to an embodiment of this application.

FIG. 8 is a schematic diagram of a structure of a communication apparatus according to an embodiment of this application. The communication apparatus 800 may be the terminal device in the embodiment shown in FIG. 5 or the embodiment shown in FIG. 7 or the chip system of the terminal device, and is configured to implement the method for the terminal device in the foregoing method embodiments. Alternatively, the communication apparatus may be the network device in the embodiment shown in FIG. 5 or the embodiment shown in FIG. 7 or the chip system of the network device, and is configured to implement the method corresponding to the network device in the foregoing method embodiments. For a specific function, refer to the description in the foregoing method embodiments.

The communication apparatus 800 includes one or more processors 801. The processor 801 may also be referred to as a processing unit, and can implement a control function. The processor 801 may be a general-purpose processor, a dedicated processor, or the like, including, for example, a baseband processor and a central processing unit. The baseband processor may be configured to process a communication protocol and communication data. The central processing unit may be configured to control the communication apparatus 800, execute a software program, and/or process data. Different processors may be independent components, or may be disposed in one or more processing circuits, for example, integrated in one or more application-specific integrated circuits.

Optionally, the communication apparatus 800 includes one or more memories 802, configured to store instructions 804, and the instructions 804 may be run on the processor, so that the communication apparatus 800 performs the method described in the foregoing method embodiments. Optionally, the memory 802 may further store data. The processor and the memory may be separately disposed, or may be integrated together.

Optionally, the communication apparatus 800 may include instructions 803 (or referred to as code or a program), and the instructions 803 may be run on the processor, so that the communication apparatus 800 performs the method described in the foregoing embodiments. The processor 801 may store data.

Optionally, the communication apparatus 800 may further include a transceiver 805 and an antenna 806. The transceiver 805 may be referred to as a transceiver unit, a transceiver, a transceiver circuit, a transceiving processor, an input/output interface, or the like, and is configured to implement a transceiver function of the communication apparatus 800 through the antenna 806.

Optionally, the communication apparatus 800 may further include one or more of the following components: a wireless communication module, an audio module, an external memory interface, an internal memory, a universal serial bus (USB) interface, a power management module, an antenna, a speaker, a microphone, an input/output module, a sensor module, a motor, a camera, a display screen, or the like. It may be understood that, in some embodiments, the communication apparatus 800 may include more or fewer components, or some components may be integrated, or some components may be split. Such components may be implemented by hardware, software, or a combination of software and hardware.

The processor 801 and the transceiver 805 described in this embodiment of this application may be implemented in an integrated circuit (IC), an analog IC, a radio frequency integrated circuit (RFID), a mixed-signal IC, an application specific integrated circuit (ASIC), a printed circuit board (PCB), an electronic device, or the like. The communication apparatus described in this specification may be an independent device (for example, an independent integrated circuit, or a mobile phone), or may be a part of a large device (for example, a module that can be embedded in another device). For details, refer to the foregoing description of the terminal device and the network device. Details are not described herein again.

An embodiment of this application provides a terminal device. The terminal device (for ease of description, referred to as UE) may be applied to the foregoing embodiments. The terminal device includes a corresponding means, a unit, and/or a circuit used to implement a function of the UE in the embodiment shown in FIG. 5 and/or FIG. 7. For example, the terminal device includes: a transceiver module, configured to support the terminal device in implementing a transceiver function, and a processing module, configured to support the terminal device in processing a signal.

Figure 9:
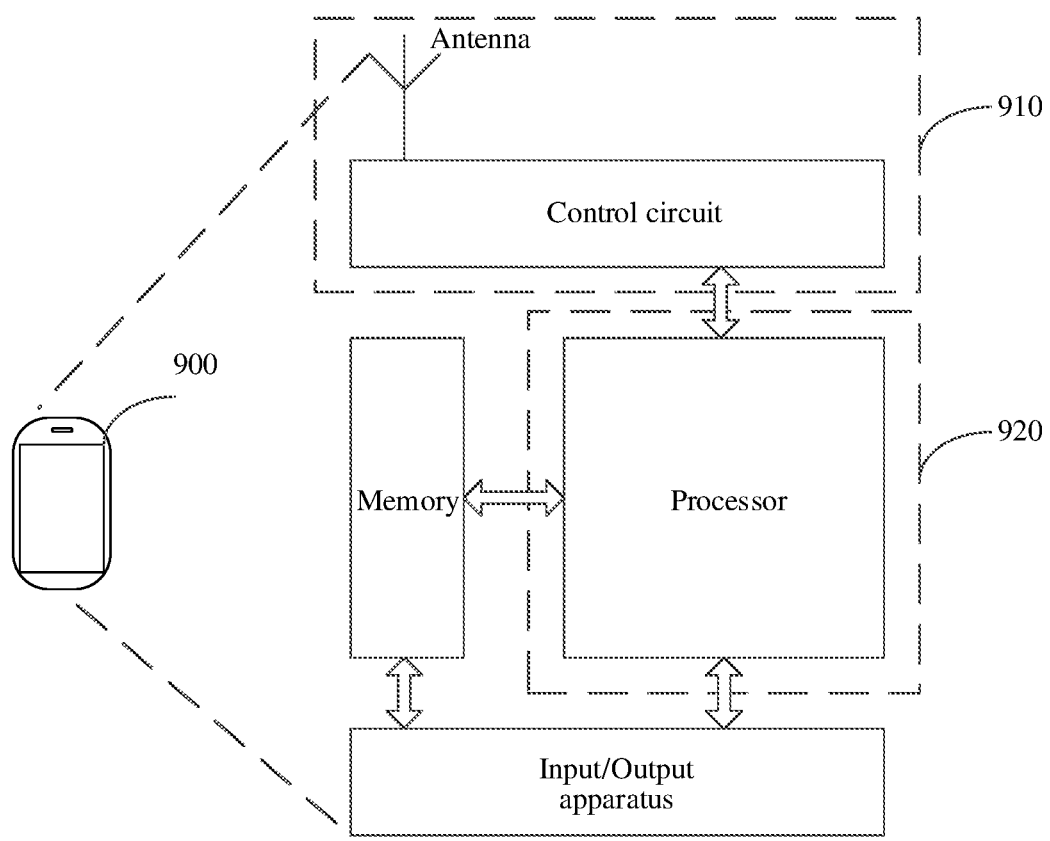
FIG. 9 is a schematic block diagram of a terminal device according to an embodiment of this application.

FIG. 9 is a schematic diagram of a structure of a terminal device according to an embodiment of this application.

The terminal device 900 may be applied to the architecture shown in any one of FIG. 1, and FIG. 4A to FIG. 4C. For ease of description, FIG. 9 shows only main components of the terminal device 900. As shown in FIG. 9, the terminal device 900 includes a processor, a memory, a control circuit, an antenna, and an input/output apparatus. The processor is mainly configured to: process a communication protocol and communication data, control the entire terminal device 900, execute a software program, and process data of the software program. The memory is mainly configured to store a software program and data. The control circuit is mainly configured to convert a baseband signal and a radio frequency signal and process the radio frequency signal. The antenna is mainly configured to receive and send the radio frequency signal in a form of an electromagnetic wave. The input/output apparatus is, for example, a touchscreen, a display screen, a microphone, or a keyboard that is mainly configured to receive data input by a user and output data to the user.

A person skilled in the art may understand that, for ease of description, FIG. 9 shows only one memory and only one processor. In some embodiments, the terminal device 900 may include a plurality of processors and memories. The memory may also be referred to as a storage medium, a storage device, or the like. This is not limited in embodiments of this application.

In an example, the antenna and the control circuit having a transceiver function may be considered as a transceiver unit 910 of the terminal device 900, and the processor having a processing function may be considered as a processing unit 920 of the terminal device 900. As shown in FIG. 9, the terminal device 900 includes the transceiver unit 910 and the processing unit 920. The transceiver unit may also be referred to as a transceiver, a transceiver machine, a transceiver apparatus, or the like. Optionally, a component that is in the transceiver unit 910 and that is configured to implement the receiving function may be considered as a receiving unit, and a component that is in the transceiver unit 910 and that is configured to implement a sending function may be considered as a sending unit. In other words, the transceiver unit 910 includes the receiving unit and the sending unit. For example, the receiving unit may also be referred to as a receiver machine, a receiver, a receiving circuit, or the like. The sending unit may be referred to as a transmitter machine, a transmitter, a transmitting circuit, or the like.

An embodiment of this application further provides a network device. The network device may be applied to the foregoing embodiments. The network device includes a means, a unit, and/or a circuit used to implement a function of the network device in the embodiment shown in FIG. 5 and/or FIG. 7. For example, the network device includes: a transceiver module, configured to support the terminal device in implementing a transceiver function, and a processing module, configured to support the network device in processing a signal.

Figure 10:
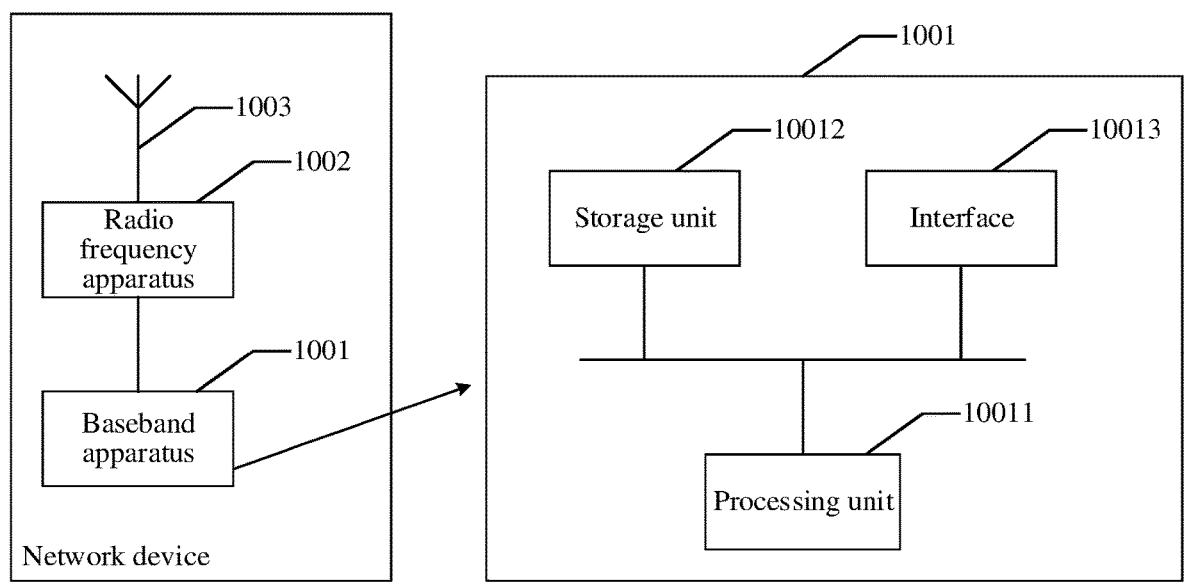
FIG. 10 is a schematic block diagram of a network device according to an embodiment of this application.

FIG. 10 is a schematic diagram of a structure of a network device according to an embodiment of this application. As shown in FIG. 10, the network device may be applied to the architecture shown in any one of FIG. 1, and FIG. 4A to FIG. 4C. The network device includes: a baseband apparatus 1001, a radio frequency apparatus 1002, and an antenna 1003. In an uplink direction, the radio frequency apparatus 1002 receives, through the antenna 1003, information sent by the terminal device, and sends the information sent by the terminal device to the baseband apparatus 1001 for processing. In a downlink direction, the baseband apparatus 1001 processes the information of the terminal device, and sends the information to the radio frequency apparatus 1002. The radio frequency apparatus 1002 processes the information of the terminal device, and then sends the information to the terminal device through the antenna 1003.

The baseband apparatus 1001 includes one or more processing units 10011, a storage unit 10012, and an interface 10013. The processing unit 10011 is configured to support the network device in performing a function of the network device in the foregoing method embodiments. The storage unit 10012 is configured to store a software program and/or data. The interface 10013 is configured to exchange information with the radio frequency apparatus 1002. The interface includes an interface circuit, configured to input and output information. In an implementation, the processing unit is an integrated circuit, for example, one or more ASICs, one or more DSPs, one or more FPGAs, or a combination of such types of integrated circuits. Such integrated circuits may be integrated to form a chip. The storage unit 10012 and the processing unit 10011 may be located in a same chip, namely, an on-chip storage element. Alternatively, the storage unit 10012 and the processing unit 10011 may be located on different chips, namely, an off-chip storage element. The storage unit 10012 may be one memory, or may be a general term of a plurality of memories or storage elements.

The network device may implement some or all of the steps in the foregoing method embodiments in a form of one or more processing units scheduling programs. For example, a corresponding function of the network device in the embodiment shown in any one of FIG. 5 and/or FIG. 7 is implemented. The one or more processing units may support radio access technologies of a same standard, or may support radio access technologies of different standards.

When several embodiments provided in this application are implemented in a form of software functional units and sold or used as independent products, the embodiments may be stored in a computer-readable storage medium. The computer software product is stored in a storage medium, and includes several instructions for instructing a computer device (which may be a personal computer, a server, a network device, or the like) to perform all or some of the steps of the method described in embodiments of this application. The foregoing computer-readable storage medium may be any available medium that can be accessed by a computer. This is used as an example but is not limited to: The computer-readable medium may include a random access memory (RAM), a read-only memory (ROM), or any other medium that can carry or store expected program code in a form of an instruction or a data structure and that can be accessed by a computer.

The foregoing descriptions are merely example implementations of this application, but are not intended to limit the protection scope of embodiments of this application. Any variation or replacement readily figured out by a person skilled in the art within the technical scope disclosed in embodiments of this application shall fall within the protection scope of embodiments of this application. Therefore, the protection scope of embodiments of this application shall be subject to the protection scope of the claims.

What is claimed is:

1. A downlink transmission method, comprising:
   determining a time domain position of at least one first transmission resource in resources of a downlink data channel, wherein when the at least one first transmission resource is a plurality of first transmission resources, start positions of time domain positions of the plurality of first transmission resources are the same; and the at least one first transmission resource can be used to transmit downlink control information;

determining, based on the time domain position of the at least one first transmission resource and time domain positions of the resources of the downlink data channel, a condition satisfied by the at least one first transmission resource, wherein the condition satisfied by the at least one first transmission resource comprises a first condition or a second condition, the first condition is that a start position of the time domain position of the at least one first transmission resource is earlier than a first time domain position, and the second condition is that the start position of the time domain position of the at least one first transmission resource is the same as or later than the first time domain position, wherein the first time domain position is a position offset by a first time interval from a start position of the time domain positions of the resources of the downlink data channel, and the first time domain position is the same as or later than the start position of the time domain positions of the resources of the downlink data channel; and determining a transmission mode of at least one of the downlink control information or the downlink data channel in the resources of the downlink data channel based on which of the first condition or the second condition is satisfied by the at least one first transmission resource.

2. The downlink transmission method according to claim 1, further comprising:
receiving first downlink control information from a network device, wherein
the at least one first transmission resource satisfies the first condition, the first downlink control information indicates that the at least one first transmission resource transmits the downlink control information, or indicates that the at least one first transmission resource does not transmit the downlink control information; or
the at least one first transmission resource satisfies the second condition, the first downlink control information indicates that the at least one first transmission resource transmits the downlink control information, or indicates that the downlink control information is monitored on the at least one first transmission resource; or
the at least one first transmission resource satisfies the second condition, the first downlink control information does not indicate that the at least one first transmission resource transmits the downlink control information, does not indicate that the at least one first transmission resource does not transmit the downlink control information, and does not indicate that the downlink control information is monitored on the at least one first transmission resource.

3. The downlink transmission method according to claim 1, further comprising:
in response to the at least one first transmission resource satisfying the first condition, determining that a quantity of cyclic redundancy check (CRC) bits of the downlink control information transmitted in the at least one first transmission resource is a first quantity of bits; or
in response to the at least one first transmission resource satisfying the first condition and a network device indicating that the at least one first transmission resource transmits the downlink control information, determining that the quantity of CRC bits of the downlink control information transmitted in the at least one first transmission resource is the first quantity of bits; and in response to the at least one first transmission resource satisfying the first condition and the network device indicating that the downlink control information is monitored on the at least one first transmission resource, determining that the quantity of CRC bits of the downlink control information transmitted in the at least one first transmission resource is a second quantity of bits,
wherein the first quantity of bits is less than the second quantity of bits.

4. The downlink transmission method according to claim 1, further comprising:
in response to the at least one first transmission resource satisfying the second condition, determining that a quantity of cyclic redundancy check (CRC) bits of the downlink control information transmitted in the at least one first transmission resource is a second quantity of bits; or
in response to the at least one first transmission resource satisfying the second condition and a network device indicating that the at least one first transmission resource transmits the downlink control information, determining that the quantity of CRC bits of the downlink control information transmitted in the at least one first transmission resource is a first quantity of bits; or
in response to the at least one first transmission resource satisfying the second condition and the network device indicating that the downlink control information is monitored on the at least one first transmission resource, determining that the quantity of CRC bits of the downlink control information transmitted in the at least one first transmission resource is the second quantity of bits,
wherein the first quantity of bits is less than the second quantity of bits.

5. The downlink transmission method according to claim 1, further comprising:
in response to the at least one first transmission resource satisfying the first condition, determining that a mapping manner used by the resources of the downlink data channel for a first transmission resource that is in the at least one first transmission resource and that transmits the downlink control information is a rate matching manner; or
in response to the at least one first transmission resource satisfying the first condition and a network device indicating that the at least one first transmission resource transmits the downlink control information, determining that the mapping manner used by the resources of the downlink data channel for a first transmission resource that is in the at least one first transmission resource and that transmits the downlink control information is the rate matching manner.

6. The downlink transmission method according to claim 1, further comprising:
in response to the at least one first transmission resource satisfying the second condition, determining that a mapping manner used by the resources of the downlink data channel for the first transmission resource that is in the at least one first transmission resource and that transmits the downlink control information is a puncturing manner; or
in response to the at least one first transmission resource satisfying the second condition and a network device indicating that the at least one first transmission resource transmits the downlink control information, determining that the mapping manner used by the resources of the downlink data channel for the first transmission resource that is in the at least one first transmission resource and that transmits the downlink control information is a rate matching manner; or in response to the at least one first transmission resource satisfying the second condition and the network device indicating that the downlink control information is monitored on the at least one first transmission resource, determining that the mapping manner used by the resources of the downlink data channel for the first transmission resource that is in the at least one first transmission resource and that transmits the downlink control information is the puncturing manner.

7. The downlink transmission method according to claim 1, further comprising:

in response to the at least one first transmission resource satisfying the first condition and a network device indicating that the at least one first transmission resource transmits the downlink control information, determining that redundancy versions of a first repetition and a second repetition of the downlink data channel in time domain are both first redundancy versions configured by the network device for the downlink data channel; and in response to the at least one first transmission resource satisfying the second condition and the network device indicating that the at least one first transmission resource transmits the downlink control information, determining that the redundancy version of the first repetition of the downlink data channel in time domain is the first redundancy version configured by the network device for the downlink data channel, and that the redundancy version of the second repetition of the downlink data channel in time domain is a second redundancy version configured by the network device for the downlink data channel.

8. The downlink transmission method according to claim 1, wherein the at least one first transmission resource is a plurality of first transmission resources, and there are two first transmission resources corresponding to different aggregation levels in the plurality of first transmission resources.

9. An apparatus, comprising:

at least one processor; and at least one memory having instructions stored thereon that, when executed by the at least one processor, cause the apparatus to:

determine a time domain position of at least one first transmission resource in resources of a downlink data channel, wherein when the at least one first transmission resource is a plurality of first transmission resources, start positions of time domain positions of the plurality of first transmission resources are the same; and the at least one first transmission resource can be used to transmit downlink control information;

determine, based on the time domain position of the at least one first transmission resource and time domain positions of the resources of the downlink data channel, a condition satisfied by the at least one first transmission resource, wherein the condition satisfied by the at least one first transmission resource comprises a first condition or a second condition, the first condition is that a start position of the time domain position of the at least one first transmission resource is earlier than a first time domain position, and the second condition is that the start position of the time domain position of the at least one first transmission resource is the same as or later than the first time domain position, wherein the first time domain position is a position offset by a first time interval from a start position of the time domain positions of the resources of the downlink data channel, and the first time domain position is the same as or later than the start position of the time domain positions of the resources of the downlink data channel; and determine a transmission mode of at least one of the downlink control information or the downlink data channel in the resources of the downlink data channel based on which of the first condition or the second condition is satisfied by the at least one first transmission resource.

10. The apparatus according to claim 9, wherein the apparatus is further caused to:

receive first downlink control information from a network device, wherein the at least one first transmission resource satisfies the first condition, the first downlink control information indicates that the at least one first transmission resource transmits the downlink control information, or indicates that the at least one first transmission resource does not transmit the downlink control information; or the at least one first transmission resource satisfies the second condition, the first downlink control information indicates that the at least one first transmission resource transmits the downlink control information, or indicates that the downlink control information is monitored on the at least one first transmission resource; or the at least one first transmission resource satisfies the second condition, the first downlink control information does not indicate that the at least one first transmission resource transmits the downlink control information, does not indicate that the at least one first transmission resource does not transmit the downlink control information, and does not indicate that the downlink control information is monitored on the at least one first transmission resource.

11. The apparatus according to claim 9, wherein the apparatus is further caused to:

in response to the at least one first transmission resource satisfying the first condition, determine that a quantity of cyclic redundancy check (CRC) bits of the downlink control information transmitted in the at least one first transmission resource is a first quantity of bits; or in response to the at least one first transmission resource satisfying the first condition and a network device indicating that the at least one first transmission resource transmits the downlink control information, determine that the quantity of CRC bits of the downlink control information transmitted in the at least one first transmission resource is the first quantity of bits; and in response to the at least one first transmission resource satisfying the first condition and the network device indicating that the downlink control information is monitored on the at least one first transmission resource, determine that the quantity of CRC bits of the downlink control information transmitted in the at least one first transmission resource is a second quantity of bits, wherein the first quantity of bits is less than the second quantity of bits.

12. The apparatus according to claim 9, wherein the apparatus is further caused to:

in response to the at least one first transmission resource satisfying the second condition, determine that a quantity of cyclic redundancy check (CRC) bits of the downlink control information transmitted in the at least one first transmission resource is a second quantity of bits; or in response to the at least one first transmission resource satisfying the second condition and a network device indicating that the at least one first transmission resource transmits the downlink control information, determine that the quantity of CRC bits of the downlink control information transmitted in the at least one first transmission resource is a first quantity of bits; or in response to the at least one first transmission resource satisfying the second condition and the network device indicating that the downlink control information is monitored on the at least one first transmission resource, determine that the quantity of CRC bits of the downlink control information transmitted in the at least one first transmission resource is the second quantity of bits, wherein the first quantity of bits is less than the second quantity of bits.

13. The apparatus according to claim 9, wherein the apparatus is further caused to:

in response to the at least one first transmission resource satisfying the first condition, determine that a mapping manner used by the resources of the downlink data channel for a first transmission resource that is in the at least one first transmission resource and that transmits the downlink control information is a rate matching manner; or in response to the at least one first transmission resource satisfying the first condition and a network device indicating that the at least one first transmission resource transmits the downlink control information, determine that the mapping manner used by the resources of the downlink data channel for a first transmission resource that is in the at least one first transmission resource and that transmits the downlink control information is the rate matching manner.

14. The apparatus according to claim 9, wherein the apparatus is further caused to:

in response to the at least one first transmission resource satisfying the second condition, determine that a mapping manner used by the resources of the downlink data channel for the first transmission resource that is in the at least one first transmission resource and that transmits the downlink control information is a puncturing manner; or in response to the at least one first transmission resource satisfying the second condition and a network device indicating that the at least one first transmission resource transmits the downlink control information, determine that the mapping manner used by the resources of the downlink data channel for the first transmission resource that is in the at least one first transmission resource and that transmits the downlink control information is a rate matching manner; or in response to the at least one first transmission resource satisfying the second condition and the network device indicating that the downlink control information is monitored on the at least one first transmission resource, determine that the mapping manner used by the resources of the downlink data channel for the first transmission resource that is in the at least one first transmission resource and that transmits the downlink control information is the puncturing manner.

15. The apparatus according to claim 9, wherein the apparatus is further caused to:

in response to the at least one first transmission resource satisfying the first condition and a network device indicating that the at least one first transmission resource transmits the downlink control information, determine that redundancy versions of a first repetition and a second repetition of the downlink data channel in time domain are both first redundancy versions configured by the network device for the downlink data channel; and in response to the at least one first transmission resource satisfying the second condition and the network device indicating that the at least one first transmission resource transmits the downlink control information, determine that the redundancy version of the first repetition of the downlink data channel in time domain is the first redundancy version configured by the network device for the downlink data channel, and that the redundancy version of the second repetition of the downlink data channel in time domain is a second redundancy version configured by the network device for the downlink data channel.

16. The apparatus according to claim 9, wherein the at least one first transmission resource is a plurality of first transmission resources, and there are two first transmission resources corresponding to different aggregation levels in the plurality of first transmission resources.

17. An apparatus, comprising:

at least one processor; and at least one memory having instructions stored thereon that, when executed by the at least one processor, cause the apparatus to:

configure resources of a downlink data channel for a terminal device, wherein the resources of the downlink data channel comprise at least one first transmission resource, when the at least one first transmission resource is a plurality of first transmission resources, start positions of time domain positions of the plurality of first transmission resources are the same, and the at least one first transmission resource can be used to transmit downlink control information; and determine a transmission mode of at least one of the downlink control information or the downlink data channel in the resources of the downlink data channel based on a condition satisfied by the at least one first transmission resource, wherein the condition satisfied by the at least one first transmission resource is a first condition or a second condition, the condition satisfied by the at least one first transmission resource is determined based on a time domain position of the at least one first transmission resource and time domain positions of the resources of the downlink data channel, the first condition is that a start position of the time domain position of the at least one first transmission resource is earlier than a first time domain position, and the second condition is that the start position of the time domain position of the at least one first transmission resource is the same as or later than the first time domain position, wherein the first time domain position is a position offset by a first time interval from a start position of the time domain positions of the resources of the downlink data channel, and the first time domain position is the same as or later than the start position of the time domain positions of the resources of the downlink data channel.

18. The apparatus according to claim 17, wherein the apparatus is further caused to:
send first downlink control information to the terminal device,
wherein
the at least one first transmission resource satisfies the first condition, the first downlink control information indicates that the at least one first transmission resource transmits the downlink control information, or indicates that the at least one first transmission resource does not transmit the downlink control information; or
the at least one first transmission resource satisfies the second condition, the first downlink control information indicates that the at least one first transmission resource transmits the downlink control information, or indicates that the downlink control information is monitored on the at least one first transmission resource; or
the at least one first transmission resource satisfies the second condition, the first downlink control information does not indicate that the at least one first transmission resource transmits the downlink control information, does not indicate that the at least one first transmission resource does not transmit the downlink control information, and does not indicate that the downlink control information is monitored on the at least one first transmission resource.

19. The apparatus according to claim 17, wherein the apparatus is further caused to:
in response to the at least one first transmission resource satisfying the first condition, determine that a quantity of cyclic redundancy check (CRC) bits of the downlink control information transmitted in the at least one first transmission resource is a first quantity of bits; or
in response to the at least one first transmission resource satisfying the first condition and the at least one first transmission resource transmitting the downlink control information, determine that the quantity of CRC bits of the downlink control information transmitted in the at least one first transmission resource is the first quantity of bits; and
in response to the at least one first transmission resource satisfying the first condition and the terminal device needing to monitor the downlink control information on the at least one first transmission resource, determine that the quantity of CRC bits of the downlink control information transmitted in the at least one first transmission resource is a second quantity of bits,
wherein the first quantity of bits is less than the second quantity of bits.

20. The apparatus according to claim 17, wherein the apparatus is further caused to:
in response to the at least one first transmission resource satisfying the second condition, determine that a quantity of cyclic redundancy check (CRC) bits of the downlink control information transmitted in the at least one first transmission resource is a second quantity of bits; or
in response to the at least one first transmission resource satisfying the second condition and the at least one first transmission resource transmitting the downlink control information, determine that the quantity of CRC bits of the downlink control information transmitted in the at least one first transmission resource is a first quantity of bits; or
in response to the at least one first transmission resource satisfying the second condition and the terminal device needing to monitor the downlink control information on the at least one first transmission resource, determine that the quantity of CRC bits of the downlink control information transmitted in the at least one first transmission resource is the second quantity of bits,
wherein the first quantity of bits is less than the second quantity of bits.

\* \* \* \* \*